United States Patent
Oki

(10) Patent No.: US 9,386,180 B2
(45) Date of Patent: Jul. 5, 2016

(54) IMAGE PROCESSING DEVICE, IMAGE PROCESSING METHOD, IMAGE PROCESSING SYSTEM, AND COMPUTER-READABLE NON-TRANSITORY RECORDING MEDIUM

(71) Applicant: Konica Minolta, Inc., Chiyoda-ku (JP)

(72) Inventor: Makoto Oki, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/476,967

(22) Filed: Sep. 4, 2014

(65) Prior Publication Data

US 2015/0077795 A1    Mar. 19, 2015

(30) Foreign Application Priority Data

Sep. 17, 2013 (JP) ................................. 2013-191438

(51) Int. Cl.
*G06F 15/00* (2006.01)
*H04N 1/00* (2006.01)

(52) U.S. Cl.
CPC ....... *H04N 1/00954* (2013.01); *H04N 1/00915* (2013.01); *H04N 1/00917* (2013.01); *H04N 2201/0081* (2013.01); *H04N 2201/0094* (2013.01)

(58) Field of Classification Search
CPC .......... H04N 1/00915; H04N 1/00954; H04N 2201/0081; H04N 2201/0094
USPC ....................................................... 358/1.15
See application file for complete search history.

(56) References Cited

U.S. PATENT DOCUMENTS

| 8,830,534 | B2 * | 9/2014 | Okumura et al. | 358/448 |
| 2008/0059548 | A1 * | 3/2008 | Oshima | 708/308 |
| 2011/0004789 | A1 * | 1/2011 | Tsujimoto | 714/18 |

FOREIGN PATENT DOCUMENTS

| JP | 2008-071346 A | 3/2008 |
| JP | 2011-199531 A | 10/2011 |
| JP | 2012-065284 A | 3/2012 |
| JP | 2012-222746 A | 11/2012 |

OTHER PUBLICATIONS

Machine translation of Japanese Patent Document No. 2012-065284, Mar. 29, 2012, Toshifumi.*
Office Action issued on Jul. 14, 2015, by the Japanese Patent Office in corresponding Japanese Patent Application No. 2013-191438, and an English Translation of the Office Action. (7 pages).
Office Action issued on Jan. 12, 2016, by the Japanese Patent Office in corresponding Japanese Patent Application No. 2013-191438, and an English translation of the Office Action. (4 pages).

* cited by examiner

*Primary Examiner* — Tammy Pham
*Assistant Examiner* — Mark Milia
(74) *Attorney, Agent, or Firm* — Buchanan Ingersoll & Rooney PC

(57) ABSTRACT

An image processing device is capable of communicating with an information processing terminal and performing image processing on a scanned image together with the information processing terminal in a distributed manner. The image processing device includes: a document feeder that automatically feeds pages of a document continuously one by one; an image reader that generates a scanned image of one page by reading the document; an image processor that generates a processed image by performing image processing on the scanned image generated by the image reader; a halt processor that makes the image processor halt the image processing; and a transmission processor that transmits the processed image generated as a result of the image processing to the information processing terminal and transmits a scanned image not to be subjected to the image processing to the information processing terminal during the image processing or after halt of the image processing.

22 Claims, 14 Drawing Sheets

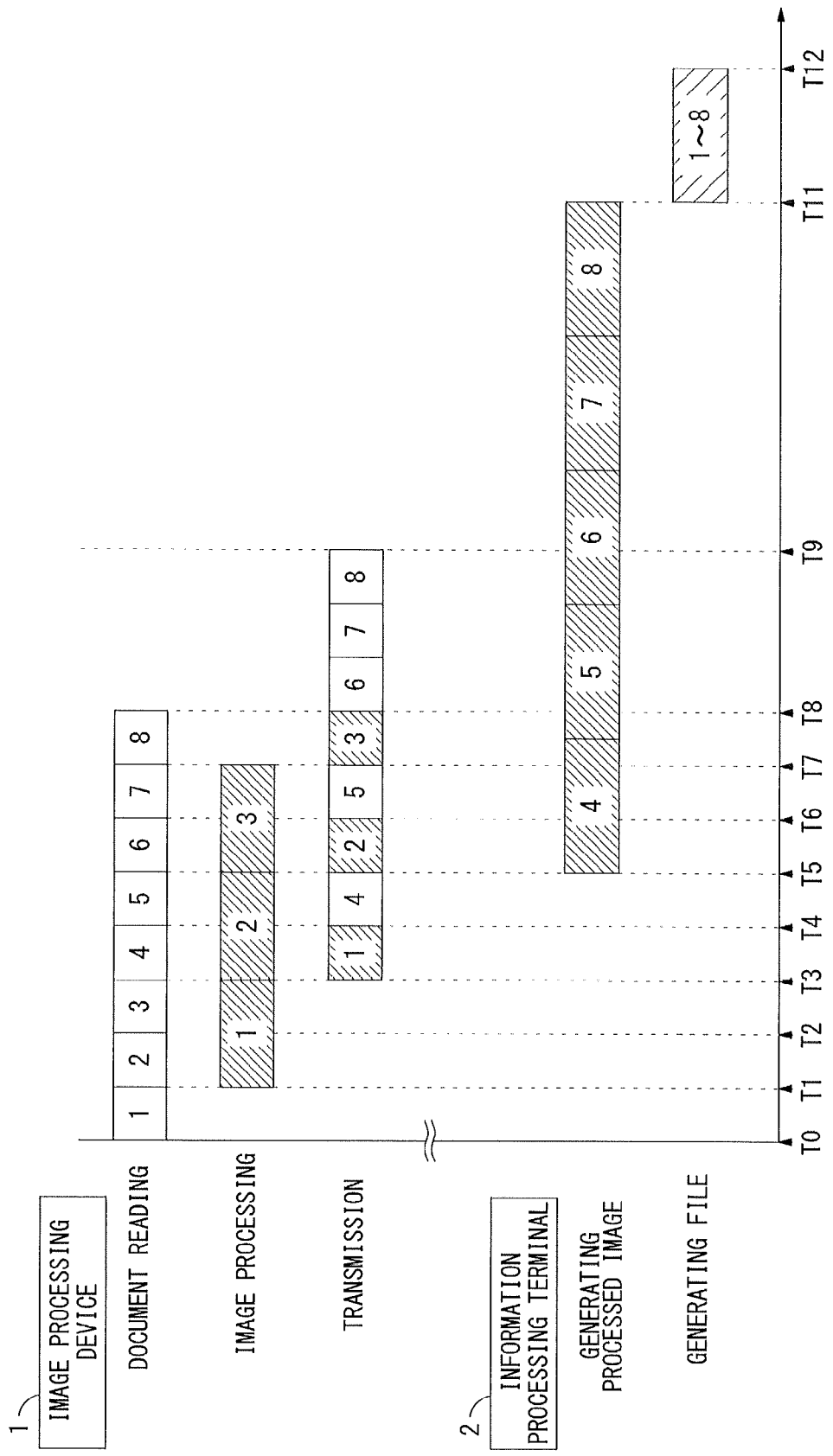

IMAGE PROCESSING DEVICE, IMAGE PROCESSING METHOD, IMAGE PROCESSING SYSTEM, AND COMPUTER-READABLE NON-TRANSITORY RECORDING MEDIUM

This application is based on the application No. 2013-191438 filed in Japan, the contents of which are hereby incorporated by reference.

BACKGROUND OF THE INVENTION

1. Field of the Invention

The present invention relates to an image processing device, an image processing method, an image processing system, and a computer-readable non-transitory recording medium. More particularly, the present invention relates to a technique of performing image processing on image data obtained by reading a document.

2. Description of the Background Art

In a technique conventionally known relating to an image reading device that generates image data by reading a document, image processing on the image data generated by reading the document is distributed to an information processing device connected to a network (as descried for example in Japanese Patent Application Laid-Open No. 2012-65284). In this conventional technique, based on the image processing performance of the information processing device and a speed of communication with the information processing device, the image reading device determines whether the information processing device is to be responsible for the image processing on the image data. If determining that the information processing device is to be responsible for the image processing, the image reading device transmits the image data to the information processing device and makes the information processing device process the image data. When the information processing device finishes the image processing, the image reading device is to receive processed data from the information processing device.

The aforementioned conventional distributed processing is intended to complete one job readily to be executed as a series of processes including generating image data by reading a document and image processing on the image data. Thus, if the image processing performance of the information processing device is low or if a speed of communication with the information processing device is low, for example, the distributed processing is not performed and the image reading device becomes responsible for the series of all the processes.

In this case, the following situation may occur: reading a document is finished completely whereas image processing has not been finished completely by the image reading device. This makes it impossible for the image reading device to start reading a next document. In particular, if image processing to be performed by the image reading device is processing such as character recognition that takes a relatively long period of time, the image processing occupies a resource (such as a CPU) of the image reading device for a long period of time even after reading a document is finished completely. This makes the image reading device wait for a longer period of time to be ready for starting reading a next document. Unfortunately, this makes it impossible for a next user to use the image reading device readily.

SUMMARY OF THE INVENTION

The present invention has been made to solve the aforementioned problem. It is an object of the present invention to provide an image processing device, an image processing method, an image processing system, and a computer-readable non-transitory recording medium that enable distributed processing by which reading a next document can be started immediately upon completion of reading a previous document.

In order to achieve this object, the present invention is first intended for an image processing device capable of communicating with an information processing terminal. The image processing device performs image processing on a scanned image together with the information processing terminal in a distributed manner. The scanned image is formed by reading a document by scanning. According to one aspect of this invention, the image processing device includes: a document feeder that automatically feeds pages of the document continuously one by one; an image reader that generates a scanned image of one page by reading the document fed by the document feeder; an image processor that generates a processed image by performing image processing on the scanned image generated by the image reader; a halt processor that makes the image processor halt the image processing; and a transmission processor that transmits the processed image generated as a result of the image processing by the image processor to the information processing terminal and transmits a scanned image not to be subjected to the image processing by the image processor to the information processing terminal during the image processing or after halt of the image processing by the image processor.

According to a different aspect of this invention, the halt processor may make the image processor halt the image processing in a period of time from when the image reader starts reading the document until when the image reader generates the scanned image of the last page.

According to a different aspect of this invention, the transmission processor may assign page information to each of the processed image generated as a result of the image processing and the scanned image not to be subjected to the image processing, and transmit the processed image and the scanned image to the information processing terminal.

According to a different aspect of this invention, the transmission processor may transmit processed images of multiple pages together to the information processing terminal after the image processing is halted.

According to a different aspect of this invention, each time the image processor generates the processed image of one page, the transmission processor may transmit the processed image of one page to the information processing terminal.

According to a different aspect of this invention, the image processing device may further include: a storage that stores a program to make the information processing terminal perform processing same as the image processing to be performed by the image processor; a connection detector that detects communication connection with the information processing terminal; and an installing unit that installs the program stored in the storage on the information processing terminal in response to detection of communication connection with the information processing terminal by the connection detector.

According to a different aspect of this invention, the halt processor may make the image processor halt the image processing at a time when the image reader finishes reading the document.

According to a different aspect of this invention, the document feeder may include a document detector that detects the presence or absence of a document, and the halt processor may determine a time when the image reader finishes reading the document in response to detection of the absence of the document by the document detector after the document feeder starts feeding the document automatically.

According to a different aspect of this invention, the halt processor may determine a page count of processed images to be generated as a result of the image processing by the image processor before the image reader starts reading the document. After the image reader starts reading the document, the halt processor may make the image processor halt the image processing in response to generation of the processed images corresponding to the page count as a result of the image processing by the image processor.

According to a different aspect of this invention, the halt processor may acquire a page amount of the document to be read by the image reader. Based on the acquired page amount of the document to be read, the halt processor may determine the page count of processed images to be generated as a result of the image processing by the image processor.

According to a different aspect of this invention, the halt processor may calculate a document reading time period required by the image reader to finish reading the document after the image reader starts reading the document based on the acquired page amount of the document to be read. The halt processor may further calculate a processing time period required by the image processor to perform the image processing on one page, and determine the page count of processed images that can be generated within the document reading time period.

According to a different aspect of this invention, if an interrupt job is received in a period of time from when the image reader starts reading the document until when the image reader finishes reading the document, the halt processor may make the image processor halt the image processing.

Second, the present invention is intended for an image processing method implemented in an image processing device capable of communicating with an information processing terminal. The method makes the image processing device perform image processing on a scanned image together with the information processing terminal in a distributed manner. The scanned image is formed by reading a document by scanning. According to one aspect of this invention, the image processing method includes the steps of: (a) automatically feeding pages of the document continuously one by one; (b) generating a scanned image of one page by reading the document automatically fed; (c) generating a processed image by performing image processing on the scanned image; (d) halting the image processing in the step (c); and (e) transmitting the processed image generated as a result of the image processing in the step (c) to the information processing terminal and transmitting a scanned image not to be subjected to the image processing to the information processing terminal during the image processing or after halt of the image processing in the step (c).

According to a different aspect of this invention, in the step (d), the image processing in the step (c) may be halted in a period of time from when reading the document is started until when the scanned image of the last page is generated in the step (b).

Third, the present invention is intended for an image processing system including an information processing terminal and an image processing device capable of communicating with the information processing terminal. According to one aspect of this invention, the image processing device forming the image processing system includes: a document feeder that automatically feeds pages of a document continuously one by one; an image reader that generates a scanned image of one page by reading the document fed by the document feeder; an image processor that generates a processed image by performing image processing on the scanned image generated by the image reader; a halt processor that makes the image processor halt the image processing; and a transmission processor that transmits the processed image generated as a result of the image processing by the image processor to the information processing terminal and transmits a scanned image not to be subjected to the image processing by the image processor to the information processing terminal during the image processing or after halt of the image processing by the image processor. The information processing terminal forming the image processing system includes: a storage that stores the processed image transmitted by the transmission processor; a processed image generating unit that generates a processed image by performing processing on the scanned image transmitted by the transmission processor same as the image processing to be performed by the image processor; and a file generating unit that combines the processed image stored in the storage and the processed image generated by the processed image generating unit into an output file.

According to a different aspect of this invention, the halt processor may make the image processor halt the image processing in a period of time from when the image reader starts reading the document until when the image reader generates the scanned image of the last page.

Fourth, the present invention is intended for a computer-readable non-transitory recording medium storing a program to be executed by an image processing device capable of communicating with an information processing terminal. The image processing device includes a document feeder that automatically feeds pages of a document continuously one by one and an image reader that generates a scanned image of one page by reading the document fed by the document feeder. According to one aspect of this invention, the program stored in the computer-readable non-transitory recording medium causes the image processing device to function as a system including: an image processor that generates a processed image by performing image processing on the scanned image generated by the image reader; a halt processor that makes the image processor halt the image processing; and a transmission processor that transmits the processed image generated as a result of the image processing by the image processor to the information processing terminal and transmits a scanned image not to be subjected to the image processing by the image processor to the information processing terminal during the image processing or after halt of the image processing by the image processor.

According to a different aspect of this invention, the halt processor may make the image processor halt the image processing in a period of time from when the image reader starts reading the document until when the image reader generates the scanned image of the last page.

BRIEF DESCRIPTION OF THE DRAWINGS

FIG. 14 shows an exemplary sequence of actions different from that of FIG. 13.

DESCRIPTION OF THE PREFERRED EMBODIMENTS

Preferred embodiments of the present invention will be described in detail below. Components common to the preferred embodiments are identified by the same reference numbers and will not be discussed repeatedly for the same description.

First Preferred Embodiment

Figure 1:
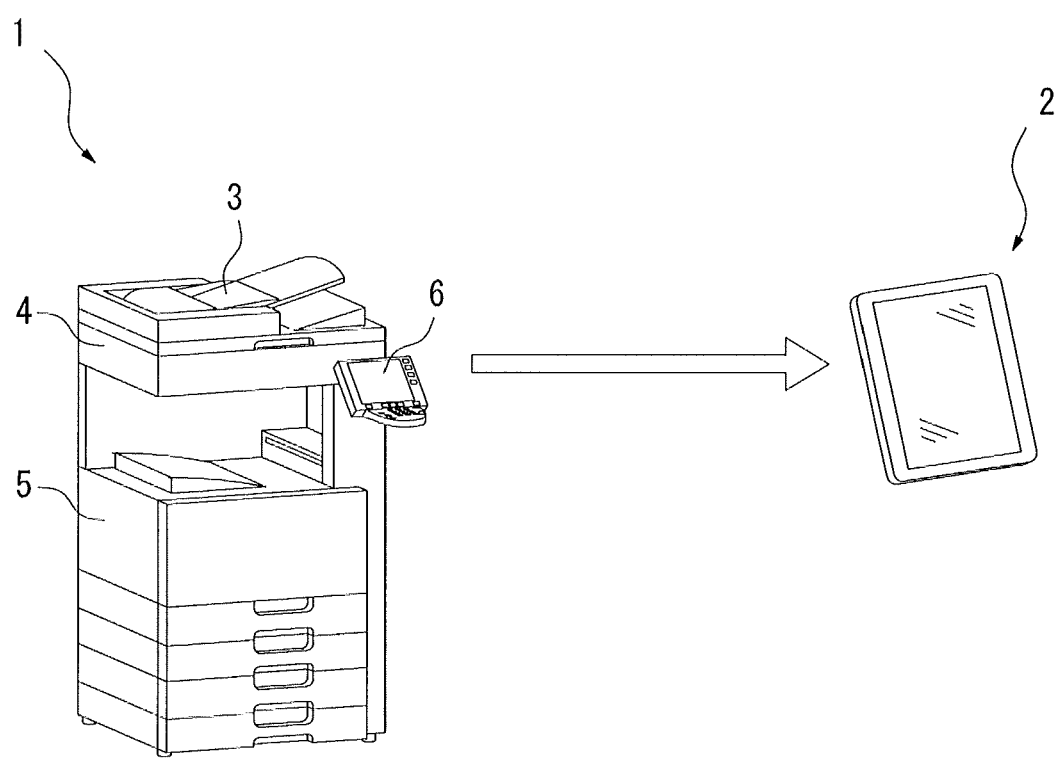
FIG. 1 is a conceptual view showing an exemplary structure of an image processing system.

FIG. 1 is a conceptual view showing an exemplary structure of an image processing system relating to the present invention. This image processing system is to allow an image processing device 1 and an information processing terminal 2 to make data communication with each other.

The image processing device 1 is formed of one of Multifunctional peripherals having a scanning function and a printing function, for example. The image processing device 1 includes an automatic document feeder 3 and an image reader 4 to work cooperatively with each other when a scan job is to be executed by using the scanning function. The automatic document feeder 3 is to automatically feed pages of a document continuously one by one placed by a user. The image reader 4 is to optically read an image of the document automatically fed by the automatic document feeder 3 when the document passes through a given reading position, thereby generating a scanned image as image data about one page.

The image processing device 1 includes an image forming unit 5 to be actuated when a print job is to be executed by using the printing function. The image forming unit 5 is to make a printed output by forming an image on a sheet material such as a print sheet based on image data received through a network such as a LAN (local area network).

The image processing device 1 further includes a user-operable operational panel 6 provided on the front side of a device body. By operating the operational panel 6, a user is allowed to perform setting operation and the like of a job to be executed by the image processing device 1.

The image processing device 1 is capable of performing various types of image processing on a scanned image of one page generated by reading a document placed by a user on the automatic document feeder 3 while executing a scan job to read the document. As an example, if the user designates image processing in advance to be performed on a scanned image during setting operation about a job, the image processing device 1 performs the image processing designated in advance by the user on scanned images generated sequentially by reading the document, thereby generating processed images from the scanned images. The processed images mentioned herein are images generated as a result of image processing on scanned images. Examples of such image processing include converting image data to PDF (portable document format) data and character recognition such as OCR (optical character recognition) on image data. However, these types of image processing are given not for limitation. In these types of image processing, a period of time required for processing a scanned image of one page is generally longer than a period of time required by the image reader 4 to generate a scanned image of one page.

The information processing terminal 2 is formed of a smartphone, a tablet terminal or a personal computer (PC), for example. The information processing terminal 2 is capable of making wired or wireless data communication. The information processing terminal 2 is capable of acquiring image data such as one about a scanned image or a processed image generated by the image processing device 1 by making data communication with the image processing device 1.

If a scan job to be executed by the image processing device 1 is a job of storing processed images of all pages of a document formed as a result of certain image processing on scanned images of all these images into the information processing terminal 2, the image processing system of the first preferred embodiment is to make the image processing device 1 and the information processing terminal 2 perform image processing on each scanned image of one page in a distributed manner. The image processing device 1 and the information processing terminal 2 forming this image processing system are described in detail below.

Figure 2:
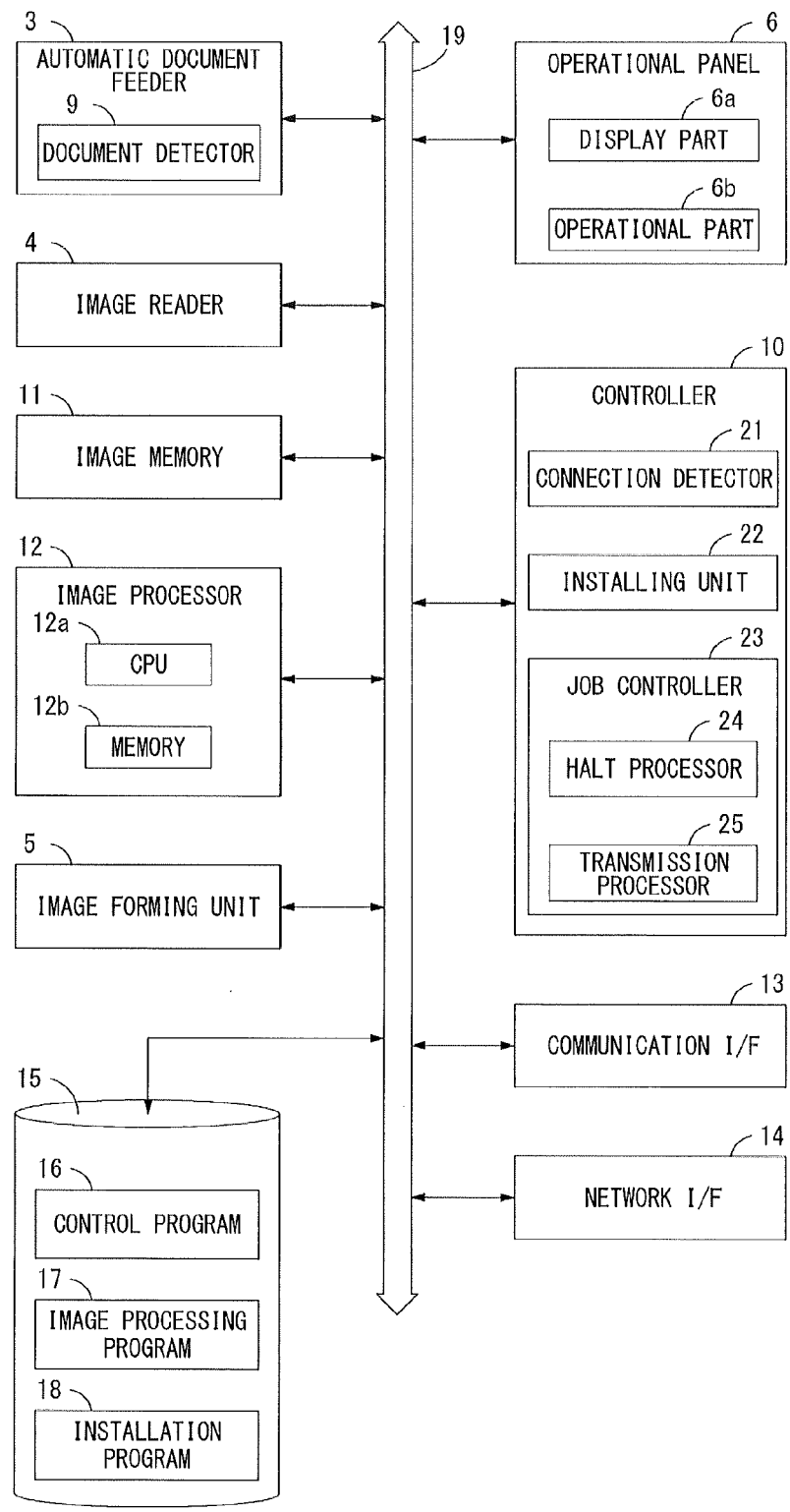
FIG. 2 is a block diagram showing an exemplary hardware structure and an exemplary functional structure of an image processing device.

FIG. 2 is a block diagram showing an exemplary hardware structure and an exemplary functional structure of the image processing device 1. The image processing device 1 includes a controller 10, an image memory 11, an image processor 12, a communication interface 13, a network interface 14, and a storage 15 in addition to the aforementioned automatic document feeder 3, image reader 4, image forming unit 5, and operational panel 6. These units are connected to each other through a data bus 19 in a manner that enables transfer of data therebetween.

The automatic document feeder 3 includes a document detector 9 to detect the presence or absence of a document. The document detector 9 is formed for example of multiple detection sensors provided in corresponding positions of a document placement surface of the automatic document feeder 3. The document detector 9 determines that a document is placed on the automatic document feeder 3 when at least one of these detection sensors detects the document. The document detector 9 is capable of determining the size of a document placed on the automatic document feeder 3 based on how many of these detection sensors are detecting the document or the positions of such sensors.

The operational panel 6 includes a display part 6a and an operational part 6b. The display part 6a is formed for example of a color liquid crystal display to present information of various types to a user who is operating the operational panel 6. The operational part 6b is formed of a touch panel sensor provided on a screen of the display part 6a or hardware keys such as a numeric keypad provided around the display part 6a. Thus, a user can perform operation for example for setting a job by operating the operational part 6b while seeing the screen on the display part 6a.

The controller 10 is responsible for overall control of respective operations of the units of the image processing device 1. The controller 10 includes a CPU and a memory not shown in the drawings. The CPU reads a control program 16 from the storage 15 and executes the control program 16, thereby making the controller 10 function as a connection detector 21, an installing unit 22, and a job controller 23.

The image memory 11 is to store image data of various types. The image memory 11 temporarily stores a scanned image generated as a result of execution of a scan job, a processed image resulting from image processing on this scanned image, and others. The image memory 11 also temporarily stores image data received as a subject for a print job through a network, for example.

The image processor 12 is responsible for various types of image processing on image data stored in the image memory 11. The image processor 12 includes a CPU 12a and a memory 12b. The CPU 12a reads an image processing program 17 from the storage 15 and executes the image processing program 17, thereby making the image processor 12 perform designated image processing on image data. As an example, if a scanned image generated by the image reader 4 in response to execution of a scan job is stored in the image memory 11, the image processor 12 reads this scanned image and performs image processing designated in advance by a user on the scanned image, thereby generating a processed image. The processed image is stored in the image memory 11. The job controller 23 controls image processing to be performed by the image processor 12.

The communication interface 13 is to make one-to-one communication for example with the information processing terminal 2. The communication interface 13 makes wired or wireless communication with the information processing terminal 2. The network interface 14 is to connect the image processing device 1 to a network such as a LAN. Further, the network interface 14 is to make communication with various devices on the network. Communication with the information processing terminal 2 may also be made through the network interface 14.

The storage 15 is a nonvolatile storage formed for example of a hard disk drive (HDD). The storage 15 stores the aforementioned control program 16 and image processing program 17 and additionally, an installation program 18 installed in advance. The installation program 18 is an image processing program for installation on the information processing terminal 2. The installation program 18 is to make the information processing terminal 2 perform image processing same as that to be performed by the image processor 12 by reading the image processing program 17.

The function of the controller 10 is described next. The connection detector 21 is to detect establishment of communication connection with the information processing terminal 2 through the communication interface 13 or the network interface 14. The connection detector 21 becomes functional if a user designates a scan job and final data (processed images of all pages) generated by executing the scan job is to be output to the information processing terminal 2. Specifically, if a user designates such a scan job, the connection detector 21 detects establishment of communication connection with the information processing terminal 2 before the scan job is executed. This scan job is not started if the connection detector 21 does not detect establishment of communication connection with the information processing terminal 2.

The installing unit 22 becomes functional in response to detection of establishment of communication connection with the information processing terminal 2 by the connection detector 21. The installing unit 22 is to install the installation program 18 on the information processing terminal 2. Specifically, if communication connection with the information processing terminal 2 is established, the installing unit 22 determines whether the information processing terminal 2 already includes an installed program that enables image processing same as that to be performed by the image processor 12. If the information processing terminal 2 does not include such a program, the installing unit 22 reads the installation program 18 from the storage 15 and transmits the installation program 18 to the information processing terminal 2, thereby installing the installation program 18 on the information processing terminal 2. If the information processing terminal 2 already includes such a program, installation is not required. The installing unit 22 performs the aforementioned processing before the image processing device 1 starts a scan job.

The job controller 23 is to control execution of a job by the image processing device 1. The job controller 23 controls execution of a scan job and additionally, controls other jobs including a print job. Meanwhile, in the first preferred embodiment, the job controller 23 performs characteristic processing if a job designated by a user is a scan job and final data generated by executing the scan job is to be output to the information processing terminal 2 as described above. Thus, the aforementioned scan job will be mentioned as an example in the following description.

In the case of a scan job, the job controller 23 instructs the image processor 12 on image processing the image processor 12 is to perform based on setting operation about a job by a user. After starting the scan job, the job controller 23 makes the automatic document feeder 3 feed a document and makes the image reader 4 read the document in synchronization with each other. Further, the job controller 23 stores a scanned image into the image memory 11 generated by the image reader 4. The job controller 23 also stores a processed image into the image memory 11 generated by making the image processor 12 perform image processing on the scanned image. As shown in FIG. 2, the job controller 23 includes a halt processor 24 and a transmission processor 25.

The halt processor 24 is to make the image processor 12 halt image processing in a period of time from when the image reader 4 starts reading a document until when the image reader 4 finishes reading the document in response to starting a scan job. As described above, image processing on a scanned image of one page by the image processor 12 takes a period of time longer than a period of time required by the image reader 4 to generate a scanned image of one page. Thus, the halt processor 24 makes the image processor 12 halt image processing at an appropriate time within a period of time from when the image reader 4 starts reading a document until when the image reader 4 finishes reading the document. This prevents the image processor 12 from performing the image processing continuously for a long period of time after the image reader 4 finishes reading the document.

The halt processor 24 of the first preferred embodiment makes the image processor 12 halt image processing at a time when the image reader 4 finishes reading a document. If the image processor 12 is performing the image processing on a scanned image at this time, the halt processor 24 is to interrupt this image processing forcibly along the way.

The transmission processor 25 is to read a processed image from the image memory 11 generated as a result of image processing by the image processor 12 and transmit the processed image to the information processing terminal 2. Further, the transmission processor 25 is to read a scanned image from the image memory 11 not to be subjected to image processing by the image processor 12 and transmit the scanned image to the information processing terminal 2 during image processing or after halt of the image processing by the image processor 12. Specifically, if a document to be read in a scan job includes multiple pages, the transmission processor 25 transmits one of a scanned image of one page and a processed image of one page to the information processing terminal 2. If a scanned image not having been subjected to image processing is transmitted from the transmission processor 25 to the information processing terminal 2, the information processing terminal 2 performs the image processing on this scanned image.

As an example, if a scanned image of one page generated by the image reader 4 is stored in the image memory 11 at a time when the image processor 12 is performing image processing on a previous scanned image, the transmission processor 25 reads the scanned image from the image memory 11 and transmits this scanned image to the information processing terminal 2. In this case, pages of images transmitted from the image processing device 1 to the information processing terminal 2 are in no particular order. Thus, the transmission processor 25 assigns page information to a scanned image or a processed image read from the image memory 11 and to be transmitted to the information processing terminal 2. Thus, even if pages of images transmitted from the image processing device 1 to the information processing terminal 2 are in no particular order, these images can be sorted in a correct order according to their pages by the information processing terminal 2.

Figure 3:
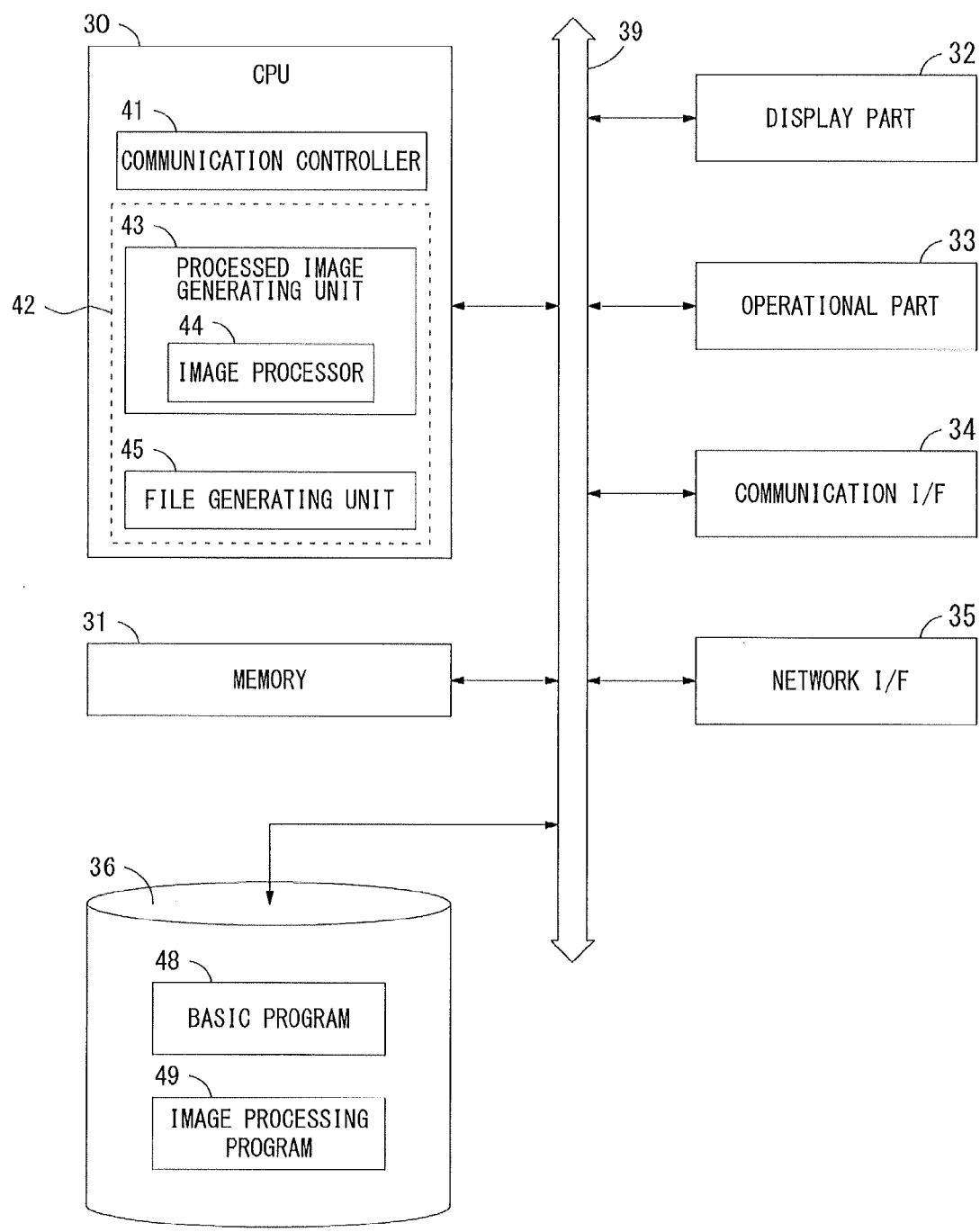
FIG. 3 is a block diagram showing an exemplary hardware structure and an exemplary functional structure of an information processing terminal.

FIG. 3 is a block diagram showing an exemplary hardware structure and an exemplary functional structure of the information processing terminal 2. The information processing terminal 2 includes a CPU 30, a memory 31, a display part 32, an operational part 33, a communication interface 34, a network interface 35, and a storage 36. These units are connected to each other through a data bus 39 in a manner that enables transfer of data therebetween.

The CPU 30 is to control the operation of each part by executing various programs stored in the storage 36. The memory 31 is to store temporary data generated as a result of execution of a program by the CPU 30, for example. The display part 32 is formed for example of a color liquid crystal display to present information of various types to a user who is operating the information processing terminal 2. The operational part 33 is formed for example of a touch panel sensor provided on a screen of the display part 32 to accept operational input from a user. The communication interface 34 is to make one-to-one communication for example with the image processing device 1. The communication interface 34 makes wired or wireless communication with the image processing device 1. The network interface 35 is to connect the information processing terminal 2 to a network such as a LAN. The network interface 35 is to make communication with various devices on the network. Communication with the image processing device 1 may also be made through the network interface 35. The storage 36 is a nonvolatile storage formed for example of a solid state drive (SSD) to store programs and data of various types.

In the example of FIG. 3, the storage 36 stores a basic program 48 and an image processing program 49. The basic program 48 is installed in advance on the information processing terminal 2. The image processing program 49 is to be installed on the storage 36 by execution of the installation program 18 by the CPU 30 transmitted from the installing unit 22 of the image processing device 1.

The CPU 30 becomes functional as a communication controller 41 by executing the basic program 48. The communication controller 41 is to make data communication with the image processing device 1 by establishing communication connection with the image processing device 1 through the communication interface 34 or the network interface 35.

The CPU 30 further becomes functional as a cooperative working unit 42 by executing the image processing program 49 to perform image processing in cooperation with the image processing device 1 while the image processing device 1 executes a scan job. When a scanned image or a processed image is received from the image processing device 1, the cooperative working unit 42 stores this image into the memory 31 temporarily and takes over subsequent processing not having been performed by the image processing device 1. As shown in FIG. 3, the cooperative working unit 42 includes a processed image generating unit 43 and a file generating unit 45.

The processed image generating unit 43 is to generate a processed image by performing image processing on a scanned image received from the image processing device 1 same as that to be performed by the image processing device 1 if this scanned image has not been subjected to the image processing. Thus, the processed image generating unit 43 includes an image processor 44 to perform image processing same as that to be performed by the image processor 12 of the image processing device 1. Speed of image processing performed by the image processor 44 depends on the performance of the CPU 30. This speed is generally lower than the processing speed of the image processor 12 of the image processing device 1. Thus, in consideration of the processing efficiency of an entire scan job, it is preferable that the image processor 12 of the image processing device 1 be responsible for as much image processing as possible on a scanned image.

The file generating unit 45 becomes functional in response to storage of processed images of all pages in a document read by the image processing device 1 into the memory 31. The file generating unit 45 is to sort the processed images of all the images in a correct order according to their pages based on page information and to combine the processed images into one output file Specifically, the file generating unit 45 combines a processed image generated by the image processor 12 of the image processing device 1 and a processed image generated by the processed image generating unit 43, thereby generating an output file corresponding to a document read by the image processing device 1. Generation of the output file by the file generating unit 45 means that final data (processed images of all pages) resulting from a scan job is held by the information processing terminal 2. Thus, the scan job started by the image processing device 1 is finished in response to generation of the output file by the file generating unit 45.

Figure 4:
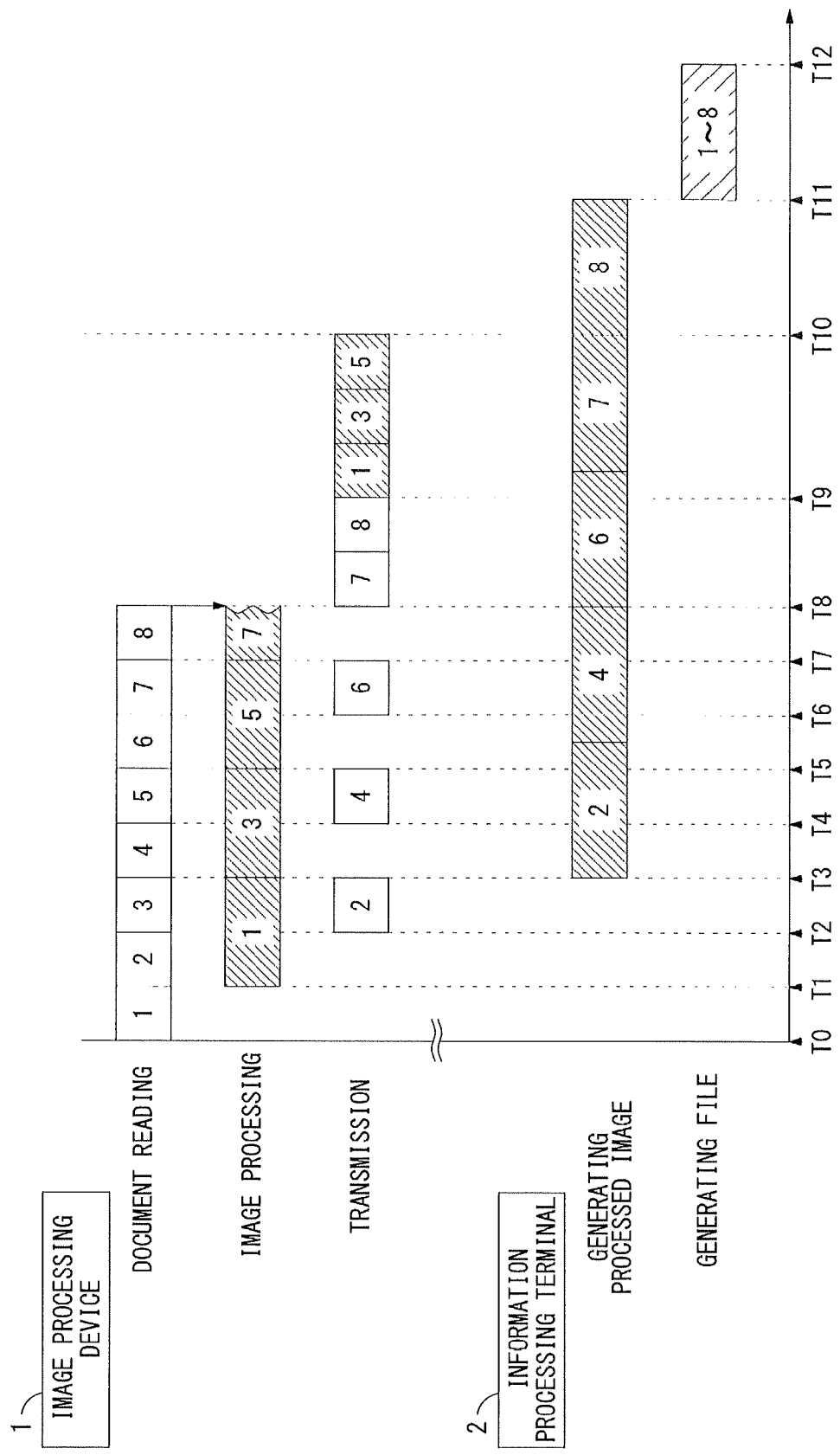
FIG. 4 shows an exemplary sequence of actions taken in the image processing system of a first preferred embodiment.

FIG. 4 shows an exemplary sequence of actions taken in the aforementioned image processing system. In the example of FIG. 4, a document including eight pages is to be read by a scan job. A number in each rectangle shows the page number of a page being processed. As shown in FIG. 4, the image processing device 1 starts reading a document at a time T0. After elapse of a certain period of time, the image processing device 1 finishes reading a first page to generate a scanned image of the first page at a time T1. Then, at the time T1, the image processing device 1 starts reading a second page and starts image processing on the scanned image of the first page. At this time, the image processing device 1 does not transmit the scanned image of the first page to the information processing terminal 2.

After elapse of a certain period of time, the image processing device 1 finishes reading the second page to generate a scanned image of the second page at a time T2. The image processing on the scanned image of the first page has not been finished at the time T2. Thus, the image processing device 1 transmits the scanned image of the second page to the information processing terminal 2. The image processing device 1 starts reading a third page at the time T2. After elapse of a certain period of time, the image processing device 1 finishes reading the third page to generate a scanned image of the third page at a time T3. The image processing on the scanned image of the first page has been completed at the time T3. Thus, the image processing device 1 starts reading a fourth page and starts image processing on the scanned image of the third page at the time T3. At this time, the image processing device 1 does not transmit the scanned image of the third page to the information processing terminal 2.

At the time T3, the information processing terminal 2 finishes receiving the scanned image of the second page transmitted from the image processing device 1. Thus, at the time T3, the information processing terminal 2 starts generating a processed image from the scanned image of the second page.

Then, after each elapse of a certain period of time, the image processing device 1 generates a scanned image of a fourth page and those of subsequent pages sequentially. If the image processor 12 is performing image processing at a time when a scanned image is generated, the image processing device 1 transmits this scanned image to the information processing terminal 2. Meanwhile, if the image processor 12 is not performing image processing at a time when a scanned image is generated, the image processing device 1 starts image processing on this scanned image. This scanned image subjected to the image processing by the image processor 12 is not transmitted to the information processing terminal 2.

The information processing terminal 2 finishes receiving the scanned image of the fourth page at a time T5. At this time, the information processing terminal 2 has not finished generating the processed image from the scanned image of the second page. Thus, the information processing terminal 2 stores the scanned image of the fourth page into the memory 31. After finishing generating the processed image from the scanned image of the second page, the information processing terminal 2 starts generating a processed image from the scanned image of the fourth page. The information processing terminal 2 follows the same processing in response to receipt of a subsequent scanned image.

The image processing device 1 finishes reading an eighth page to generate a scanned image of the eighth page at a time T8. As a result, the document reading by the image reader 4 is finished completely. Then, the halt processor 24 becomes functional in the image processing device 1 to make the image processor 12 halt image processing. Specifically, image processing is being performed on a scanned image of a seventh page at the time T8. Thus, the halt processor 24 interrupts this image processing along the way. As a result, a processed image of the seventh page will not be generated in the image processing device 1. Thus, the image processing device 1 reads the scanned image of the seventh page from the image memory 11 and transmits this scanned image to the information processing terminal 2. The image processing device 1 transmits the scanned image of the eighth page to the information processing terminal 2 after transmitting the scanned image of the seventh page. When finishing transmitting the scanned image of the eighth page at a time T9, the image processing device 1 transmits processed images of multiple pages together to the information processing terminal 2 having been generated by the image processor 12 until image processing is halted. Transmission of these processed images is completed at a time T10.

The information processing terminal 2 generates processed images sequentially from the scanned images received from the image processing device 1. After generation of a processed image from the scanned image of the eighth page is completed, the file generating unit 45 generates an output file. The scan job is finished when generation of the output file is completed at a time T12.

According to the aforementioned sequence of actions shown in FIG. 4, completion of transmission of the processed images from the image processing device 1 means that processing to be performed by the image processing device 1 is finished completely. Specifically, in a period after the time T10 when transmission of the processed images is completed, the information processing terminal 2 continues residual processing relating to the scan job whereas there is no processing to be performed by the image processing device 1. Thus, if document reading is completed while a scan job is incomplete, the image processing device 1 can start a next scan job readily and can start document reading at an early stage thereafter.

Figure 5:
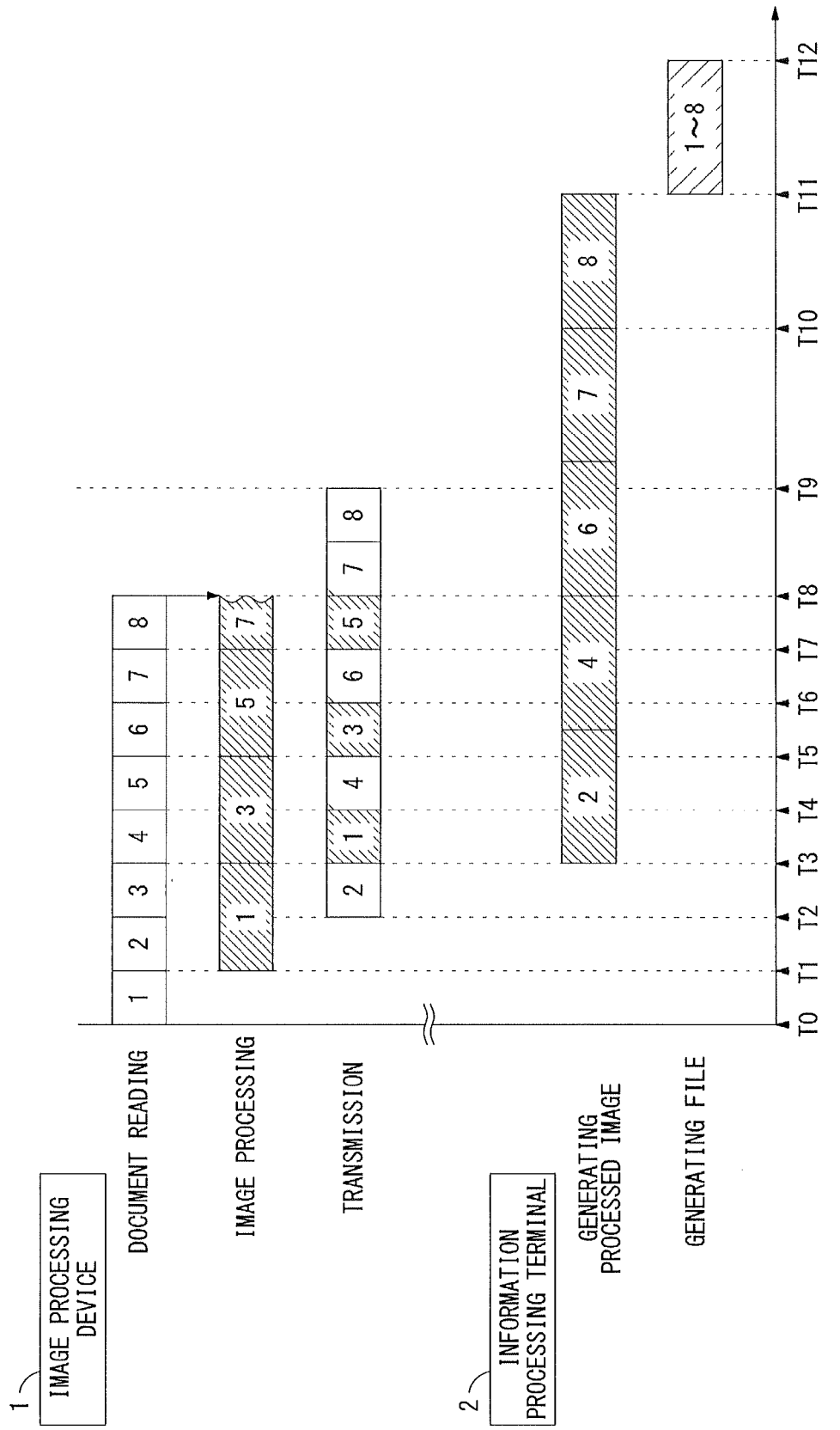
FIG. 5 shows an exemplary sequence of actions different from that of FIG. 4.

FIG. 5 shows an exemplary sequence of actions different from that of FIG. 4. In the exemplary sequence shown in FIG. 4, after the image processing device 1 halts image processing, processed images of multiple pages are transmitted together to the information processing terminal 2. In the exemplary sequence shown in FIG. 5, each time a processed image of one page is generated as a result of image processing performed by the image processing device 1, this processed image is transmitted to the information processing terminal 2.

According to the sequence of actions shown in FIG. 5, each time a processed image of one page is generated by the image processing device 1, this processed image is transmitted to the information processing terminal 2. Thus, a processed image of a first page is transmitted after a scanned image of a second page is transmitted. A processed image of a third page is transmitted after a scanned image of a fourth page is transmitted. Likewise, a processed image of a fifth page is transmitted after a scanned image of a sixth page is transmitted.

In the example of FIG. 5, completion of transmission of a scanned image of an eighth page from the image processing device 1 means that processing to be perfoaned by the image processing device 1 is finished completely. Specifically, in a period after a time T9 when transmission of the scanned image of the eighth page is completed, the information processing terminal 2 continues residual processing relating to a scan job whereas there is no processing to be performed by the image processing device 1. Thus, if document reading is completed while the scan job is incomplete, the image processing device 1 can start a next scan job readily and can start document reading at an early stage thereafter.

The sequence of actions shown in FIG. 4 and the sequence of actions shown in FIG. 5 can be selected freely. It is assumed for example that a period of time required to transmit a scanned image of one page and a period of time required to transmit a processed image of one page are the same as or shorter than a period of time required to read one page of a document. In this case, according to the sequence of actions of FIG. 5, a processed image is transmitted in a gap of time between when two scanned images are transmitted. This achieves higher transmission efficiency than the sequence of actions of FIG. 4. Meanwhile, a period of time required to transmit a scanned image of one page and a period of time required to transmit a processed image of one page actually depend for example on an image size, so that they are not always the same as or shorter than a period of time required to read one page of a document. It is assumed for example that a period of time required for the transmission becomes longer than a period of time required to read one page of a document so that a gap of time will not be generated between when two scanned images are transmitted. In this case, employing the sequence of actions of FIG. 5 necessitates interrupt of continuous transmission of scanned images with transmission of a processed image. This in turn results in lower transmission efficiency than the sequence of actions of FIG. 4. Hence, the sequence of actions shown in FIG. 4 and the sequence of actions shown in FIG. 5 may be selected freely depending on a period of time required for transmission or an image size, for example.

Figure 6:
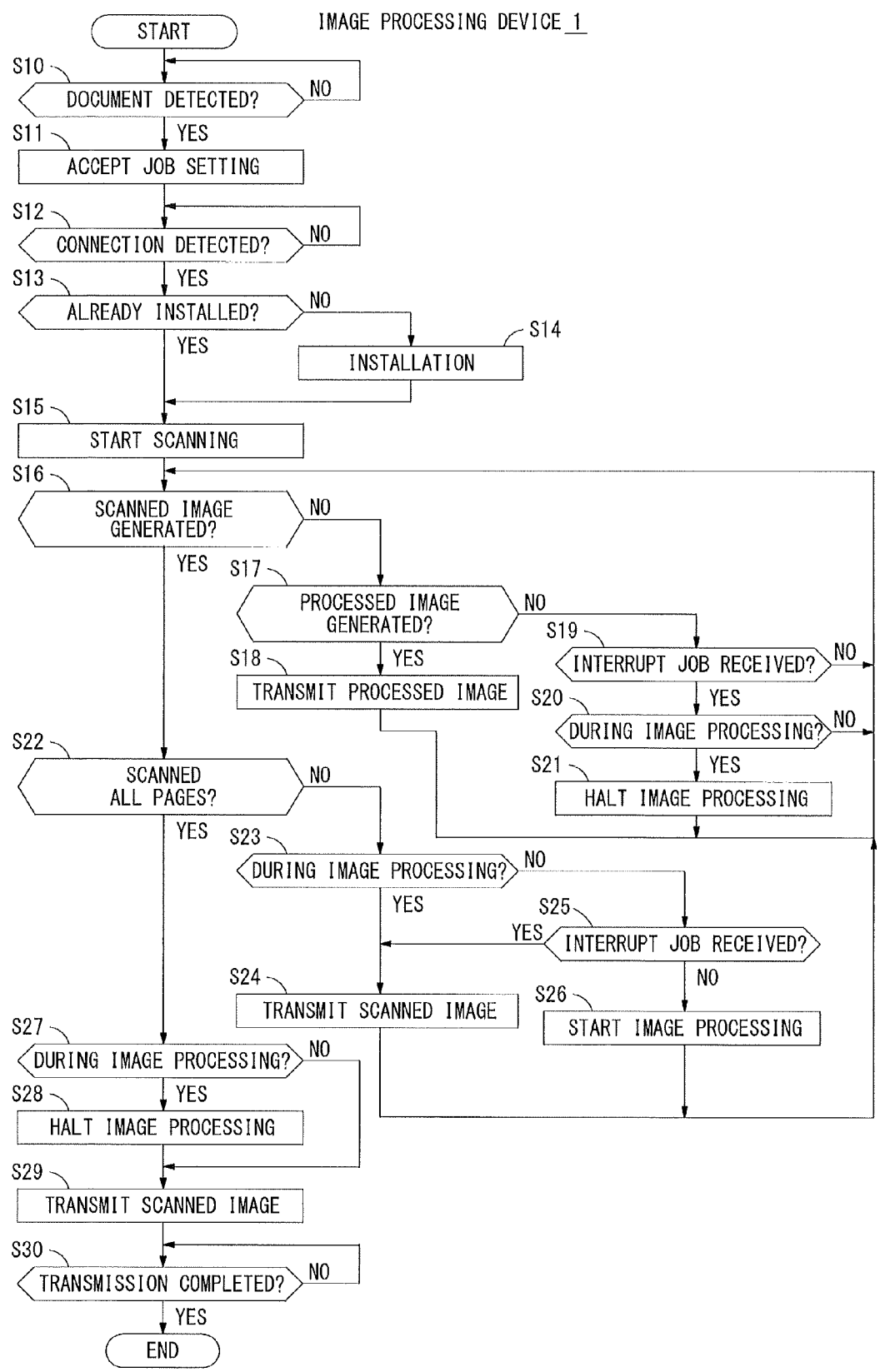
FIG. 6 is a flowchart showing exemplary procedure taken by the image processing device of the first preferred embodiment.

FIG. 6 is a flowchart showing exemplary procedure taken by the image processing device 1 of the first preferred embodiment. In the procedure shown in this flowchart, image processing by the image processor 12 is halted not only at a time when reading all pages of a document is completed but also when a high-priority interrupt job (such as a print job) is received for example through a network during document reading. The procedure shown in this flowchart relates to control of execution of a scan job by the controller 10 of the image processing device 1.

If the document detector 9 detects a document placed on the automatic document feeder 3 (YES of step S10), the controller 10 of the image processing device 1 displays a job setting screen on the display part 6a of the operational panel 6 to accept setting operation about a job by a user (step S11). Then, the user designates a scan job and designates the information processing terminal 2 as a destination of output of final data to be generated by the scan job. The user further designates image processing to be performed on a scanned image. After the job setting operation by the user is accepted, the connection detector 21 becomes functional in the controller 10 and is kept in standby until it detects communication connection with the information processing terminal 2 (step S12). If communication connection is detected (YES of step S12), the installing unit 22 becomes functional in the controller 10. The installing unit 22 communicates with the information processing terminal 2 to determine whether the image processing program 49 is installed on the information processing terminal 2 (step S13). If determining that the image processing program 49 is not installed (NO of step S13), the installing unit 22 transmits the installation program 18 to the information processing terminal 2 to install the image processing program 49 on the information processing terminal 2 (step S14).

Next, the job controller 23 becomes functional in the controller 10 to start the scan job in the image processing device 1 (step S15). This makes the automatic document feeder 3 and the image reader 4 work cooperatively to start reading the document. The job controller 23 executes a loop from step S16 to step S26 until reading all pages of the document is finished. In this loop, the job controller 23 first determines whether the image reader 4 has generated a scanned image of one page (step S16). If a scanned image has not been generated (NO of step S16), the job controller 23 determines whether the image processor 12 has generated a processed image (step S17). If a processed image has been generated, the job controller 23 transmits this processed image to the information processing terminal 2 (step S18). If a processed image has not been generated (NO of step S17), the job controller 23 determines whether a high-priority interrupt job has been received for example through a network (step S19). If determining that a high-priority interrupt job has been received (YES of step S19), the job controller 23 determines whether the image processor 12 is performing image processing (step S20). If image processing is being performed, the job controller 23 makes the image processor 12 halt this image processing (step S21). Step S21 is omitted if image processing is not being performed. Then, the job controller 23 returns to step S16 to repeat the aforementioned procedure until the image reader 4 generates a scanned image.

If the image reader 4 has generated a scanned image (YES of step S16), the job controller 23 determines whether reading all pages of the document has been finished (step S22). If reading all pages of the document has not been finished (NO of step S22), the job controller 23 determines whether the image processor 12 is performing image processing (step S23). If image processing is being performed, the job controller 23 transmits the generated scanned image to the information processing terminal 2 (step S24). Meanwhile, if the image processor 12 is not performing image processing (NO of step S23), the job controller 23 determines whether an interrupt job has ben received (step S25). If an interrupt job has been received, the job controller 23 proceeds to step S24 to transmit the generated scanned image to the information processing terminal 2. If an interrupt job has not been received (NO of step S25), the job controller 23 makes the image processor 12 start image processing on the scanned image (step S26). Then, the job controller 23 returns to step S16 to repeat the aforementioned procedure.

If the image reader 4 finishes reading all the pages of the document (YES of step S22), the job controller 23 determines whether the image processor 12 is performing image processing (step S27). If image processing is being performed, the job controller 23 makes the image processor 12 halt this image processing (step S28). If the image processor 12 is not performing image processing, the job controller 23 is not required to make the image processor 12 halt image processing. Then, the job controller 23 transmits a scanned image in the image memory 11 to the information processing terminal 2 (step S29). At this time, if a processed image yet to be transmitted remains in the image memory 11, this processed image is transmitted together. If the image processing is halted in step S28 and a processed image has not been generated from a scanned image as a result of the halt, this scanned image is also transmitted to the information processing terminal 2. When transmission of these images is completed (YES of step S30), the job controller 23 finishes the processing completely relating to the scan job to be performed by the image processing device 1. Thus, if document reading by the image reader 4 is finished and then transmission of a scanned image and a processed image is completed, the image processing device 1 can start a next scan job thereafter.

In the aforementioned procedure, receipt of a high-priority interrupt job during document reading also makes the image processor 12 halt image processing. This releases the image processing device 1 from a scan job at an early stage to allow the image processing device 1 to start the interrupt job readily.

Figure 7:
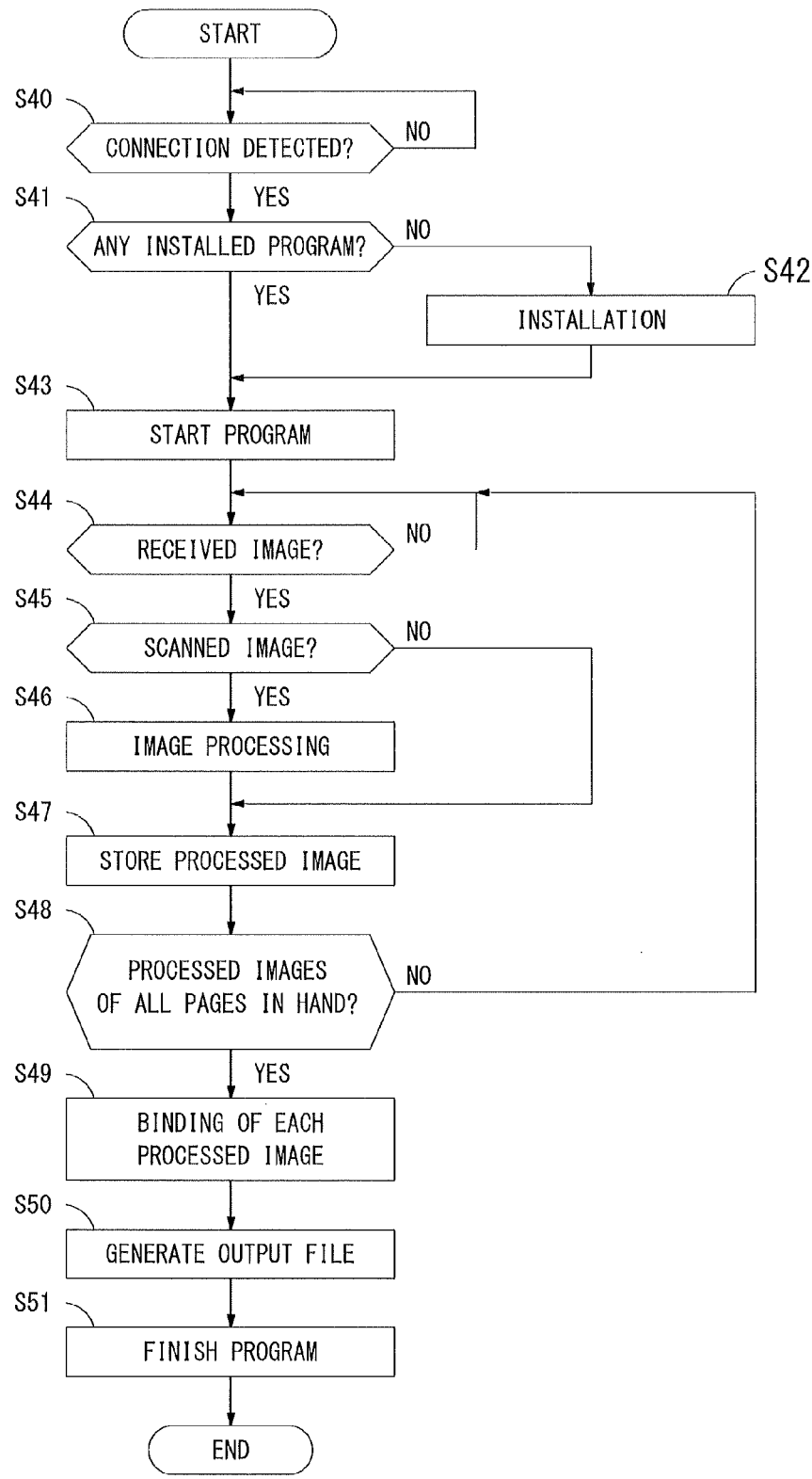
FIG. 7 is a flowchart showing exemplary procedure taken by the information processing terminal.

FIG. 7 is a flowchart showing exemplary procedure taken by the information processing terminal 2. This procedure is taken by the CPU 30 of the information processing terminal 2. After this procedure is started, the communication controller 41 is first kept in standby in the information processing terminal 2 until the communication controller 41 detects communication connection with the image processing device 1 (step S40). If communication connection with the image processing device 1 is detected, the information processing terminal 2 determines whether the image processing program 49 for cooperation with the image processing device 1 is installed on the information processing terminal 2 (step S41). In the absence of the image processing program 49, the information processing terminal 2 executes the installation program 18 transmitted from the image processing device 1 to install the image processing program 49 (step S42). Step S42 is omitted if the image processing program 49 has already been installed. Then, the information processing terminal 2 starts the image processing program 49 (step S43). This makes the cooperative working unit 42 functional in the CPU 30 to execute a scan job in cooperation with the image processing device 1. The cooperative working unit 42 is kept in standby until an image is received from the image processing device 1 (step S44). If an image has been received, the cooperative working unit 42 determines whether this image is a scanned image not having been subjected to image processing (step S45). If determining that this image is a scanned image (YES of step S45), the cooperative working unit 42 makes the processed image generating unit 43 functional to perform image processing on the received scanned image same as that to be performed by the image processor 12 of the image processing device 1 (step S46). As a result, a processed image is generated from the received scanned image. The cooperative working unit 42 stores this processed image into the memory 31 temporarily (step S47). If the image received from the image processing device 1 is a processed image (NO of step S45), the cooperative working unit 42 stores this received processed image into the memory 31 temporarily (step S47).

Then, the cooperative working unit 42 determines whether processed images of all pages of a document are in hand (step S48). If all these processed images are not in hand, the cooperative working unit 42 returns to step S44 to repeat the aforementioned procedure from step S45 to step S47 each time an image is received from the image processing device 1. If processed images of all the pages of the document are stored in the memory 31 (YES of step S48), the cooperative working unit 42 makes the file generating unit 45 functional. Based on page information about each processed image, the file generating unit 45 sorts the processed images in a correct according to their pages and then performs binding (step S49). Then, the file generating unit 45 combines all the processed images into one output file (step S50). This output file is stored for example in the storage 36. Storing the output file means completion of the scan job designated by a user. Then, the information processing terminal 2 finishes the image processing program 49 to finish the procedure completely (step S51).

The aforementioned procedure taken by the information processing terminal 2 allows the information processing terminal 2 to perform image processing continuously and independently of the image processing device 1 after the image processing device 1 completes transmission of a scanned image and a processed image. Thus, even if the information processing terminal 2 has not finished the procedure relating to the scan job, the image processing device 1 can execute a next job at a time when the image processing device 1 completes transmission of images of all the pages.

The image processing device 1 described above is to make the image processor 12 halt image processing at a time when the image reader 4 actually finishes reading all pages of a document. However, this is for illustration and not for limitation. The image processing device 1 may make the image processor 12 halt image processing at a different time as descried in the following example. The automatic document feeder 3 includes the document detector 9 to detect the presence or absence of a document. When feeding the last page of a document placed on the document placement surface is started while pages of the document are fed one by one by the automatic document feeder 3, the document detector 9 detects the absence of the document immediately after feeding the last page is started. The document detector 9 detects the absence of the document at a time before the image reader 4 finishes reading the last page. It may be determined that reading the document by the image reader 4 is finished at a time when the document detector 9 detects the absence of the document.

Figure 8:
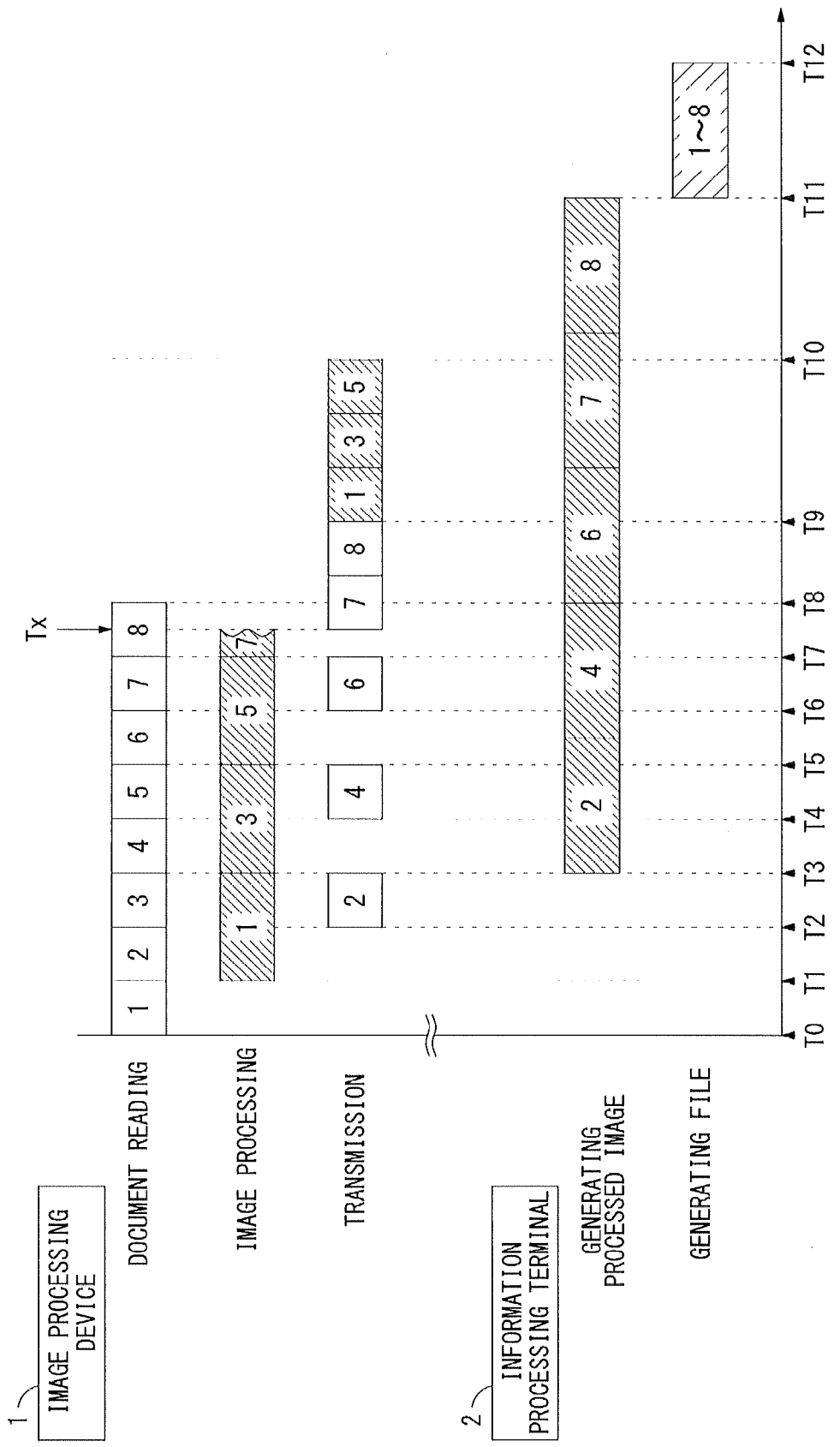
FIG. 8 shows an exemplary sequence of actions taken if an image processor is to halt image processing at a time when a document detector detects the absence of a document.

FIG. 8 shows an exemplary sequence of actions taken if the image processor 12 is to halt image processing at a time when the document detector 9 detects the absence of a document. The document detector 9 detects the absence of a document at a time Tx while the image reader 4 is reading the last page (eighth page) of the document. If the image processor 12 is performing image processing at the time Tx, the image processing device 1 makes the image processor 12 halt this image processing. In the example of FIG. 8, image processing on a scanned image of a seventh page is halted. Then, the image processing device 1 starts transmitting the scanned image of the seventh page to the information processing terminal 2 at the time Tx when the image processing is halted. In this way, the image processing is halted at the time Tx when the document detector 9 detects the absence of the document. This allows the image processing device 1 to start transmitting a scanned image remaining in the image memory 11 at a relatively early stage. As a result, as clearly understood from a comparison between FIGS. 8 and 4, the sequence of FIG. 8 has an advantage over the sequence of FIG. 4 in that a time T10 in the sequence of FIG. 8 when the image processing device 1 becomes free and becomes capable of starting a next job is earlier than the time T10 in the sequence of FIG. 4.

As described above, the image processing system of the first preferred embodiment is capable of making the image processing device 1 and the information processing terminal 2 perform image processing on a scanned image in a distributed manner so as to allow the image processing device 1 to start reading a next document readily after the image processing device 1 completes reading a previous document. Finishing one scan job to be executed as a series of processes including generating a scanned image by reading a document and image processing on the scanned image may take a longer period of time accordingly than finishing a conventional scan job. Meanwhile, in the first preferred embodiment, even if a scan job has not been finished, the image processing device 1 can become free and can start a next job at an earlier stage than in a conventional case. This achieves a greater degree of convenience than the conventional case. In particular, the image processing device 1 of the aforementioned type is to be shared between multiple users. A period of time when the image processing device 1 is occupied by a job executed by one user can be as short as possible. This offers convenience for a different user and enhances the operating rate of the image processing device 1.

In the first preferred embodiment, not all scanned images generated by the image processing device 1 are to be transmitted to the information processing terminal 2 from the beginning but the image processor 12 performs image processing to generate a processed image until document reading by the image reader 4 is finished. Thus, the image processing device 1 can become free at an early stage while reduction in the processing efficiency of an entire scan job is suppressed to a minimum.

Second Preferred Embodiment

A second preferred embodiment is described next. In the aforementioned processing of the first preferred embodiment, a page amount of a document (the number of pages to be read) to be read is not known when the image processing device 1 starts a scan job. Hence, the image processor 12 is to halt image processing at a time when the image reader 4 finishes document reading. Meanwhile, if a page amount of a document (the number of pages to be read) to be read is known in advance, a page count of processed images to be generated as a result of image processing by the image processor 12 can be determined before a scan job is started. The second preferred embodiment described herein is to determine such a page count in advance. The hardware structure and the functional structure of an image processing system, those of an image processing device 1, and those of an information processing terminal 2 of the second preferred embodiment are the same as those described in the first preferred embodiment.

In order to determine a page count of processed images to be generated as a result of image processing by the image processor 12 in advance before a scan job is started, information about a page amount of a document to be read should be prepared as described above. Thus, in the second preferred embodiment, a user is to enter a page count as a page amount of a document on the operational panel 6 during setting operation about a scan job.

Figure 9:
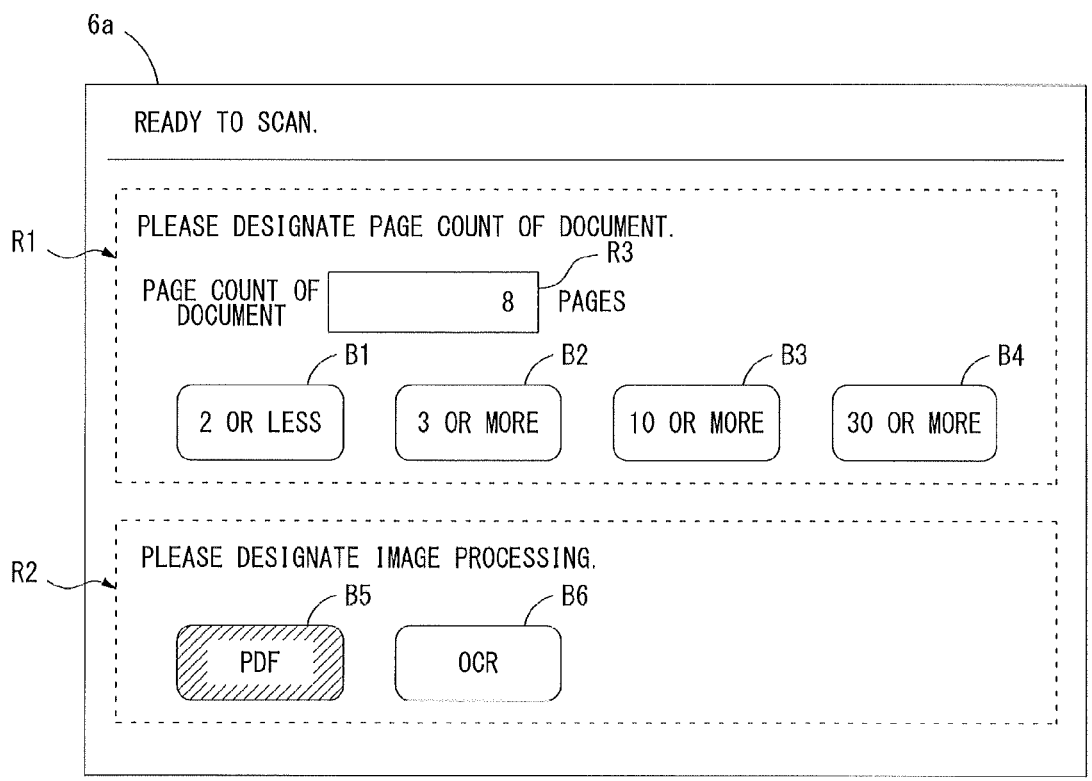
FIG. 9 shows an exemplary scan job setting screen displayed on a display part of an operational panel.

FIG. 9 shows an exemplary scan job setting screen displayed on the display part 6a of the operational panel 6. This setting screen includes a document page count designation field R1 where a user is to designate a page count of a document, and an image processing designation field R2 where the user is to designate image processing.

The document page count designation field R1 includes a numerical value entry field R3 where a user can enter an accurate numerical value of a page count of a document by operating a numeric keypad, for example. Thus, if the user knows a page count of a document accurately, the user can enter an accurate numerical value of the page count in the numerical value entry field R3 by operating the numeric keypad, for example, However, the user does not always know a page count of a document accurately if the page count is high. In this case, urging the user himself or herself to determine the page count accurately before the user uses the image processing device 1 reduces the convenience of the image processing device 1. Thus, in the second preferred embodiment, multiple estimate selection buttons B1, B2, B3 and B4 appear in a lower part of the document page count designation field R1 as shown in FIG. 9. The user can determine an estimate of a page count of a document by selecting the estimate selection button B1, B2, B3 or B4. The user can select one from the estimate selection buttons B1 to B4. Thus, if the user roughly knows a minimum page count of a document while not knowing an accurate page count, the user has only to select a button corresponding to such an estimate. In the example of FIG. 9, a page count "8" of a document is entered in the numerical value entry field R3.

The image processing designation field R2 includes a PDF button B5 and an OCR button B6. A user can determine image processing by selecting the PDF button B5 or the OCR button B6. The PDF button B5 is to be selected to designate image processing of converting a scanned image to PDF data. The OCR button B6 is to be selected to designate character recognition on a scanned image by OCR. The user can also select one from the buttons B5 and B6, for example. This way of designating image processing is applicable not only to the second preferred embodiment but also to the aforementioned first preferred embodiment. In the example of FIG. 9, the PDF button B5 is selected by the user.

In this way, in the second preferred embodiment, a user enters a page count of a document during setting operation about a scan job. When the user enters the page count, the halt processor 24 becomes functional in the controller 10 of the image processing device 1. Before the image reader 4 starts document reading, the halt processor 24 determines a page count N of processed images in advance to be generated as a result of image processing by the image processor 12.

If a user enters an accurate numerical value of a page count of a document, for example, the halt processor 24 calculates a document reading time period Ts based on the entered page count required by the image reader 4 to finish document reading after the image reader 4 starts the document reading. Further, based on image processing designated by the user, the halt processor 24 calculates a processing time period Tp required by the image processor 12 to perform this image processing on one page. Based on the processing time period Tp for one page, the halt processor 24 determines the page count N of processed images that can be generated within the document reading time period Ts.

If a user enters an estimate of a page count of a document, the halt processor 24 determines a fixed value N to be the page count N of processed images to be generated as a result of image processing by the image processor 12. The fixed value N is defined in advance in association with this estimate of the page count. As an example, if the user selects "two or less" as an estimate of a page count of a document, the halt processor 24 determines a page count of processed images to be generated as a result of image processing by the image processor 12 to be a fixed value "0." As another example, if the user selects "three or more" as an estimate of a page count of a document, the halt processor 24 determines a page count of processed images to be generated as a result of image processing by the image processor 12 to be a fixed value "1." As still another example, if the user selects "ten or more" as an estimate of a page count of a document, the halt processor 24 determines a page count of processed images to be generated as a result of image processing by the image processor 12 to be a fixed value "3." As still another example, if the user selects "30 or more" as an estimate of a page count of a document, the halt processor 24 determines a page count of processed images to be generated as a result of image processing by the image processor 12 to be a fixed value "9." The fixed value N can be changed according to image processing selected by the user.

In this way, the halt processor 24 determines the page count N of processed images in advance to be generated as a result of image processing by the image processor 12. After the image processing device 1 starts a scan job and when a page count of processed images actually generated by the image processor 12 reaches the predetermined page count N, the halt processor 24 makes the image processor 12 halt image processing such that the image processor 12 will not proceed further with the image processing. Like in the first preferred embodiment, if an interrupt job is received while document reading has not been finished, the image processor 12 is to halt image processing at a time when this interrupt job is received.

Figure 10:
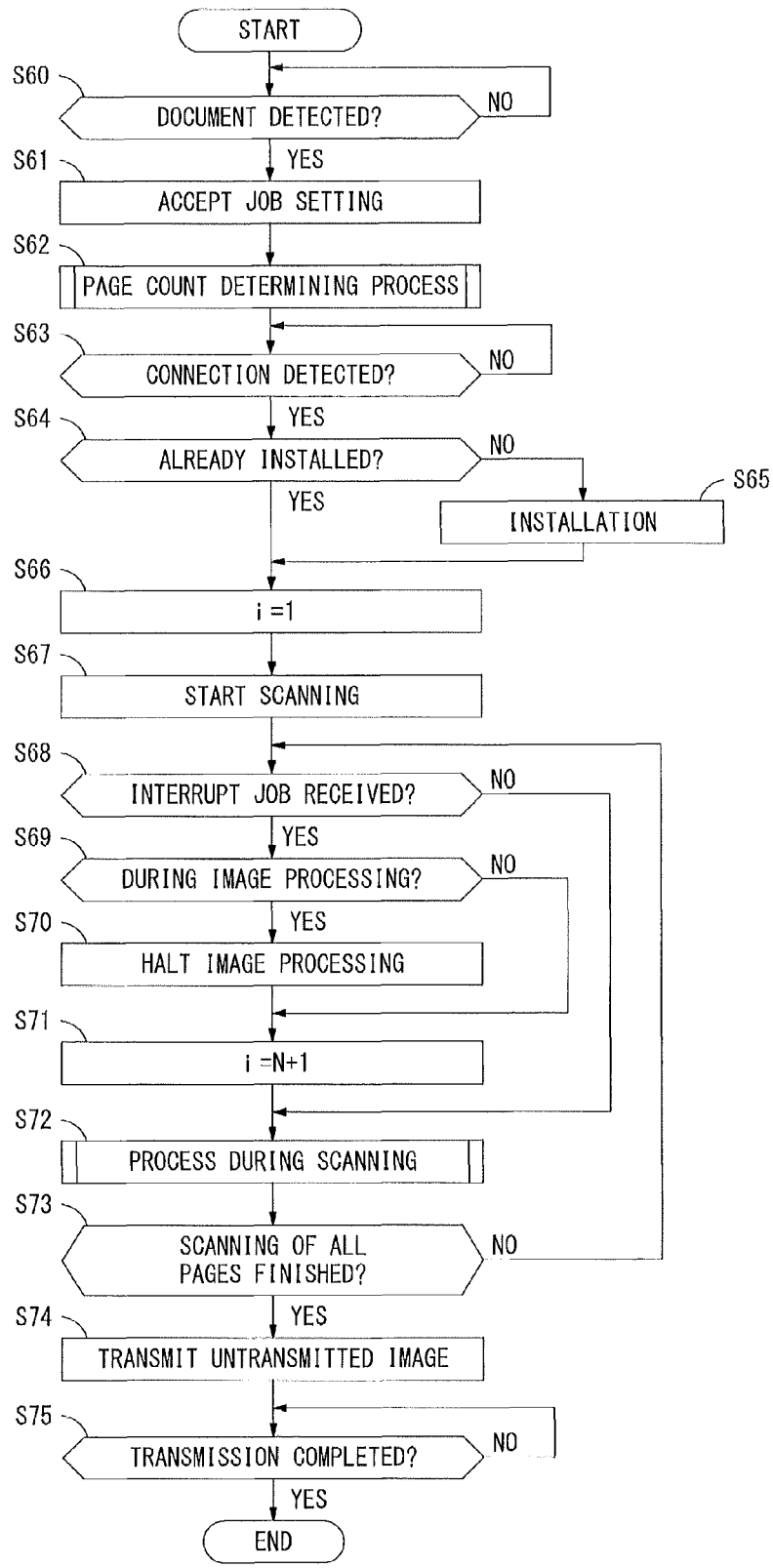
FIG. 10 is a flowchart showing exemplary procedure taken by an image processing device of a second preferred embodiment.

FIG. 10 is a flowchart showing exemplary procedure taken by the image processing device 1 of the second preferred embodiment. The procedure shown in this flowchart relates to control of execution of a scan job by the controller 10 of the image processing device 1.

If the document detector 9 detects a document placed on the automatic document feeder 3 (YES of step S60), the controller 10 of the image processing device 1 displays a job setting screen on the display part 6a of the operational panel 6 to accept setting operation about a job by a user (step S61). Then, the user designates a scan job and designates the information processing terminal 2 as a destination of output of final data to be generated by executing the scan job. After the user designates the scan job, the controller 10 displays the scan job setting screen of FIG. 9 on the display part 6a to accept designation of a page count of the document and destination of image processing by the user. After the setting operation about the job by the user is accepted, the halt processor 24 becomes functional in the controller 10 to perform page count determining process to determine the page count N in advance (step S62).

Figure 11:
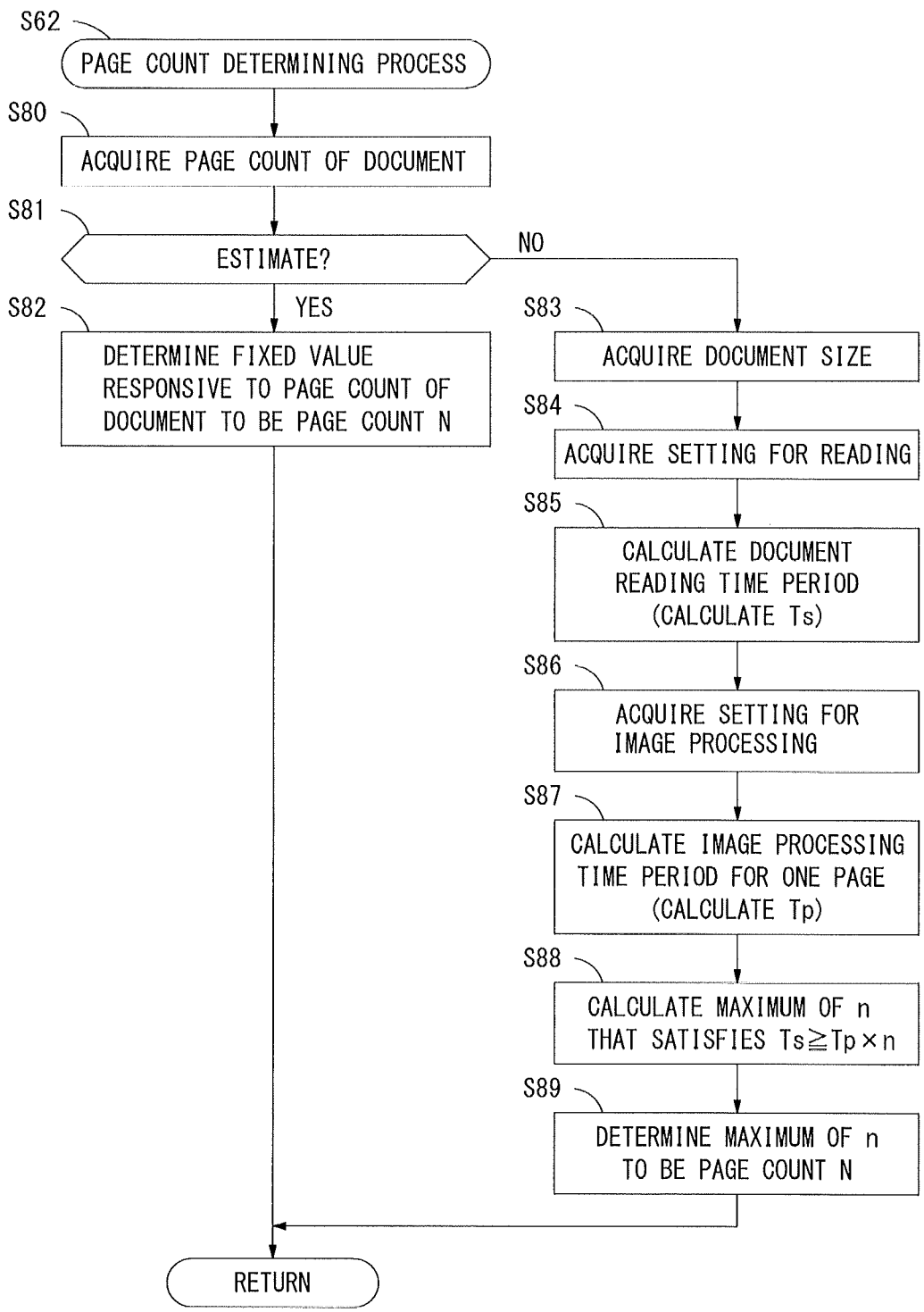
FIG. 11 shows exemplary procedure of a page count determining process in detail.

FIG. 11 shows exemplary procedure of the page count determining process (step S62) in detail. The halt processor 24 acquires the page count of the document designated by the user (step S80). Then, the halt processor 24 determines whether this page count is entered as an estimate (step S81). Specifically, the halt processor 24 determines that this page count is an estimate if the user has selected one of the estimate selection buttons B1 to B4. The halt processor 24 determines that this page count is not an estimate if the user has entered a numerical value in the numerical value entry field R3. If determining that the page count of the document is an estimate (YES of step S81), the halt processor 24 determines the fixed value N responsive to the estimate of the page count of the document to be the page count N of processed images to be generated as a result of image processing by the image processor 12 (step S82).

If the user has entered an accurate numerical value in the numerical value entry field R3 (NO of step S81), the halt processor 24 acquires the size of the document detected by the document detector 9 (step S83) and then acquires setting by the user for document reading (step S84). Based on the page count of the document, the size of the document and the setting for reading, the halt processor 24 calculates the document reading time period Ts required by the image reader 4 to finish reading the entire document after the image reader 4 starts reading the document (step S85). A scanned image to be subjected to image processing by the image processor 12 has not been generated when the image reader 4 is reading a first page of the document. It is preferable accordingly that the document reading time period Ts to be calculated be a period of time required by the image reader 4 to finish reading all the remaining pages of the document after the image reader 4 starts reading a second page of the document. Then, the halt processor 24 acquires the setting for image processing designated by the user (step S86). Based on this setting for image processing, the halt processor 24 calculates the processing time period Tp required by the image processor 12 to perform image processing on one page (step S87). Then, the halt processor 24 calculates a maximum of a natural number n that satisfies the condition of $Ts \geq Tp \times n$ (step S88). The halt processor 24 determines the maximum of the natural number n to be the page count N of processed images to be generated as a result of image processing by the image processor 12 (step S89).

Referring back to FIG. 10, after the page count N is thereby determined, the connection detector 21 detector becomes functional in the controller 10 and is kept in standby until it detects communication connection with the information processing terminal 2 (step S63). If communication connection is detected (YES of step S63), the installing unit 22 becomes functional in the controller 10. Like in the first preferred embodiment, if the image processing program 49 is not installed on the information processing terminal 2 (NO of step S64), the installing unit 22 installs the image processing program 49 on the information processing terminal 2 (step S65).

Next, the job controller 23 becomes functional in the controller 10. The job controller 23 initializes a count value i indicating a count of processed images to be generated to "1" (step S66) and then starts the scan job (step S67). This makes the automatic document feeder 3 and the image reader 4 work cooperatively to start reading the document. The job controller 23 executes a loop from step S68 to step S73 until reading all pages of the document is finished.

In this loop, the job controller 23 first determines whether an interrupt job has been received (step S68). If determining that an interrupt job has been received (YES of step S68), the job controller 23 further determines whether the image processor 12 is performing image processing (step S69). If determining that image processing is being performed (YES of step S69), the job controller 23 makes the halt processor 24 functional. Then, the halt processor 24 makes the image processor 12 halt this image processing (step S70). Step S70 is omitted if image processing is not being performed. Next, the job controller 23 rewrites the count value i as "N+1" in response to receipt of the interrupt job (step S71). This prevents further image processing by the image processor 12. Steps S69 to S71 are omitted if an interrupt job has not been received (NO of step S68).

Figure 12:
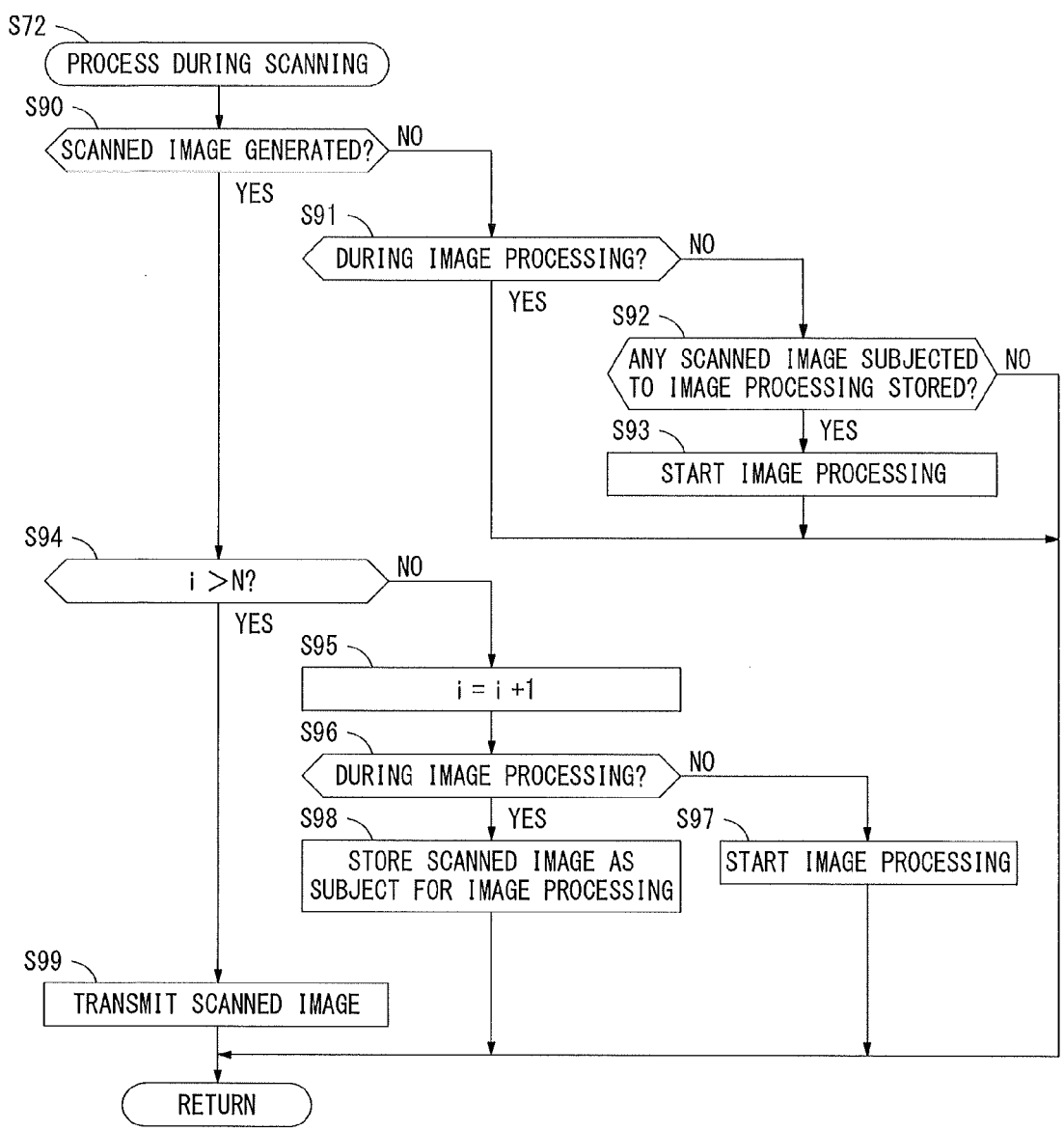
FIG. 12 is a flowchart showing exemplary procedure of a process during scanning in detail.

Next, the job controller 23 performs a process during scanning (step S72). FIG. 12 is a flowchart showing exemplary procedure of the process during scanning (step S72) in detail. After this procedure is started, the job controller 23 determines whether the image reader 4 has generated a scanned image of one page (step S90). If a scanned image has not been generated (NO of step S90), the job controller 23 determines whether the image processor 12 is performing image processing (step S91). If image processing is being performed (YES of step S91), the job controller 23 finishes the process during scanning. If image processing is not being performed (NO of step S91), the job controller 23 determines whether a scanned image to be subjected to image processing is stored in the image memory 11 (step S92). If such a scanned image is stored in the image memory 11 (YES of step S92), the job controller 23 makes the image processor 12 start image processing on this scanned image (step S93). If there is no scanned image to be subjected to image processing, the process during scanning is finished.

If the image reader 4 has generated a scanned image of one page (YES of step S90), the job controller 23 determines whether the count value i exceeds the predetermined page count N (step S94). If the count value i does not exceed the page count N (NO of step S94), the job controller 23 adds "1" to the count value i (step S95). Then, the job controller 23 determines whether the image processor 12 is performing image processing (step S96). If image processing is being performed, the job controller 23 stores the scanned image generated by the image reader 4 into the image memory 11 as a subject for image processing (step S98). If the image processor 12 is not performing image processing (NO of step S96), the job controller 23 makes the image processor 12 start image processing on the scanned image (step S97).

If the count value i exceeds the predetermined page count N (YES of step S94) when the image reader 4 generates the scanned image of one page, the job controller 23 transmits the scanned image as it is generated by the image reader 4 to the information processing terminal 2 (step S99).

Referring back to FIG. 10, the job controller 23 determines whether reading all pages of the document has been finished (step S73). If reading all the pages of the document has not been finished (NO of step S73), the job controller 23 returns to step S68 to repeat the aforementioned procedure. If reading all pages of the document has been finished (YES of step S73), the job controller 23 reads images (scanned image and processed image) yet to be transmitted from the image memory 11 and transmits these images to the information processing terminal 2 (step S74). After completing transmission of these images (YES of step S75), the job controller 23 finishes the processing relating to the scan job completely to be performed by the image processing device 1. Thus, like the image processing device 1 of the first preferred embodiment, if document reading by the image reader 4 is finished and then transmission of a scanned image and a processed image is completed, the image processing device 1 of the second preferred embodiment can start a next scan job thereafter.

Figure 13:
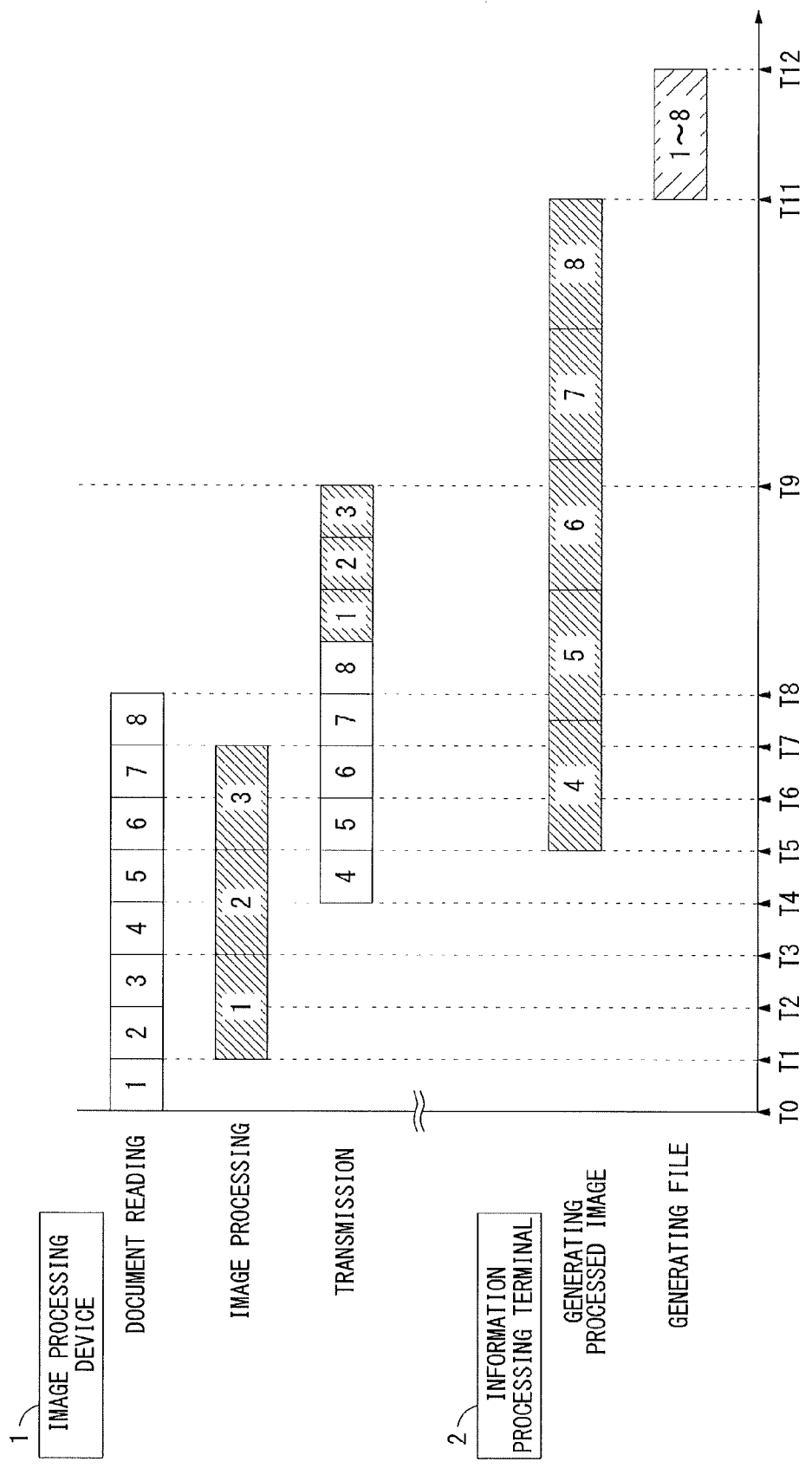
FIG. 13 shows an exemplary sequence of actions taken in an image processing system of the second preferred embodiment.

FIG. 13 shows an exemplary sequence of actions taken in an image processing system of the second preferred embodiment. In the example of FIG. 13, a document including eight pages is to be read by a scan job. Further, as an accurate numerical value, a user has entered eight as a page count of a document in setting operation about the job. In this example, before the image processing device 1 starts reading the document, the halt processor 24 determines the page count N of processed images to be generated by the image processor 12 to be "3" in advance based on the user's entry indicating that the page count of the document is eight. As shown in FIG. 13, the image processing device 1 starts reading the document at a time T0. The image processing device 1 finishes reading a first page to generate a scanned image of the first page at a time T1. Then, at the time T1, the image processing device 1 starts reading a second page and starts image processing on the scanned image of the first page. At this time, the count value i becomes "2."

The image processing device 1 finishes reading a second page to generate a scanned image of the second page at a time T2. The image processing on the scanned image of the first page has not been finished at the time T2. Thus, the scanned image of the second page is stored as a subject for image processing into the image memory 11. Then, the count value i becomes "3." The image processing device 1 starts reading a third page at the time T2. Then, the image processing device 1 finishes reading the third page to generate a scanned image of the third page at a time T3. The image processing on the scanned image of the first page has been completed at the time T3. Thus, the image processing device 1 reads the scanned image of the second page and starts image processing on this scanned image. As a result, the scanned image of the third page is stored as a subject for image processing into the image memory 11. Then, the count value i becomes "4," so that the count value i exceeds the predetermined page count "3." A scanned image to be generated subsequently is not to be subjected to image processing by the image processor 12 accordingly.

When a scanned image of a fourth page is generated thereafter at a time T4, the image processing device 1 transmits the scanned image of the fourth page to the information processing terminal 2. This applies to respective scanned images of fifth, sixth, seventh and eighth pages to be generated thereafter. The image processing device 1 transmits these scanned images sequentially to the information processing terminal 2.

After the scanned images are received from the image processing device 1, the information processing terminal 2 starts generating processed images from the scanned images to generate the processed images of the corresponding pages sequentially. If a next scanned image is received while one processed image is being generated, the information processing terminal 2 stores the received scanned image into the memory 31. The information processing terminal 2 starts generating a processed image from the next scanned image after finishing generating a processed image from a previous scanned image.

The image processing by the image processing device 1 is finished at a time T7 to generate processed images of three pages. The image processing by the image processing device 1 is halted thereafter, so that additional image processing is not started by the image processing device 1. Thus, in the second preferred embodiment, image processing by the image processing device 1 is not interrupted forcibly along the way. This achieves excellent processing efficiency in that there is no need to start fruitless image processing and there is no need to interrupt image processing forcibly. In the example of FIG. 13, the processed images of the three pages generated by the image processing device 1 are transmitted together in a latter stage to the information processing terminal 2.

The image processing device 1 finishes reading the eighth page to generate a scanned image of the eighth page at a time T8. As a result, document reading by the image reader 4 is finished completely. Then, the image processing device 1 transmits a scanned image and processed images yet to be transmitted. This transmission completes at a time T9.

According to the aforementioned sequence of actions shown in FIG. 13, completion of transmission of images from the image processing device 1 means that processing to be performed by the image processing device 1 is finished completely. Specifically, in a period after the time T9 when transmission is completed, the information processing terminal 2 continues residual processing relating to the scan job whereas there is no processing to be performed by the image processing device 1. Thus, if document reading is completed while the scan job is incomplete, the image processing device 1 can start a next scan job readily and can start document reading at an early stage thereafter.

FIG. 14 shows an exemplary sequence of actions different from that of FIG. 13. In the exemplary sequence shown in FIG. 13, after the image processing device 1 halts image processing, processed images of multiple pages are transmitted together to the information processing terminal 2. In the exemplary sequence shown in FIG. 14, each time a processed image of one page is generated as a result of image processing performed by the image processing device 1, this processed image is transmitted to the information processing terminal 2.

According to the sequence of actions shown in FIG. 14, each time a processed image of one page is generated by the image processing device 1, this processed image is transmitted to the information processing terminal 2. Thus, a processed image of a first page is transmitted before a scanned image of a fourth page is transmitted. A processed image of a second page is transmitted after the scanned image of the fourth page is transmitted. A processed image of a third page is transmitted after a scanned image of a fifth page is transmitted.

In the example of FIG. 14, completion of transmission of a scanned image of an eighth page from the image processing device 1 means that processing to be performed by the image processing device 1 is finished completely. Specifically, in a period after a time T9 when transmission of the scanned image of the eighth page is completed, the information processing terminal 2 continues residual processing relating to a scan job whereas there is no processing to be performed by the image processing device 1. Thus, if document reading is completed while the scan job is incomplete, the image processing device 1 can start a next scan job readily and can start document reading at an early stage thereafter. The sequence of actions shown in FIG. 13 and the sequence of actions shown in FIG. 14 can be selected freely.

As descried above, in the image processing device 1 of the second preferred embodiment, the page count N of processed images to be generated as a result of image processing by the image processor 12 is determined before the image reader 4 starts document reading. After the image reader 4 starts document reading, the image processor 12 performs image processing to generate processed images corresponding to the page count N. In response, the image processor 12 is made to halt the image processing. In this structure, finishing document reading by the image reader 4 does not interrupt image processing forcibly along the way being performed by the image processor 12 to avoid fruitless processing, thereby achieving excellent processing efficiency.

In the illustration given above, a user enters a page count of a document manually during setting operation about a scan job. However, manual operation by a user is not the only way for the image processing device 1 to acquire a page count of a document to be read. As an example, a contact sensor or a non-contact sensor may be provided that determines the height (thickness) of a document placed on the document placement surface of the automatic document feeder 3. A page count of the document may be calculated based on a detected value of such a sensor. In this case, the user is not required to enter a page count of the document manually. A page count of the document is calculated automatically by placing the document on the automatic document feeder 3. This enhances operability while a scan job is being executed.

The second preferred embodiment is the same as the first preferred embodiment except for those mentioned above.

(Modifications)

The present invention is not to be limited to the first and second preferred mentioned described above but can be modified in various ways.

As an example, in the aforementioned preferred embodiments, the image processing device is formed of a multifunction machine. This is given only for illustration and not for limitation. What is required for the image processing device is to have a function of generating a scanned image by reading a document and a function of performing image processing on the scanned image. Thus, the image processing device may also be formed of a scanner.

In the aforementioned preferred embodiments, examples of image processing to be performed on a scanned image include conversion to PDF data and character recognition such as OCR. The image processing to be performed on a scanned image may be translation, color conversion or tone conversion, for example.

What is claimed is:

1. An image processing device capable of communicating with an information processing terminal, the image processing device performing image processing on a scanned image together with the information processing terminal in a distributed manner, the scanned image being formed by reading a document possessing a plurality of pages by scanning, the image processing device comprising:
   a document feeder that automatically feeds pages of the document continuously one by one;
   an image reader that generates a scanned image of one page by reading the document fed by the document feeder;
   an image processor that generates a processed image by performing image processing on the scanned image generated by the image reader;
   a halt processor that makes the image processor halt the image processing; and
   a transmission processor that transmits the processed image of at least one page of the plurality of pages generated as a result of the image processing by the image processor to the information processing terminal and transmits a scanned image of at least another page of the plurality of pages that has not been subjected to the image processing by the image processor to the information processing terminal during the image processing or after halt of the image processing by the image processor,
   wherein the one page of the plurality of pages and the another page of the plurality of pages are different pages in the document.

2. The image processing device according to claim 1, wherein the halt processor makes the image processor halt the image processing in a period of time from when the image reader starts reading the document until when the image reader generates the scanned image of the last page.

3. The image processing device according to claim 1, wherein the transmission processor assigns page information to each of the processed image generated as a result of the image processing and the scanned image not to be subjected to the image processing, and transmits the processed image and the scanned image to the information processing terminal.

4. The image processing device according to claim 1, wherein the transmission processor transmits processed images of multiple pages together to the information processing terminal after the image processing is halted.

5. The image processing device according to claim 1, wherein each time the image processor generates the processed image of one page, the transmission processor transmits the processed image of one page to the information processing terminal.

6. The image processing device according to claim 1, further comprising:
   a storage that stores a program to make the information processing terminal perform processing same as the image processing to be performed by the image processor;
   a connection detector that detects communication connection with the information processing terminal; and
   an installing unit that installs the program stored in the storage on the information processing terminal in response to detection of communication connection with the information processing terminal by the connection detector.

7. The image processing device according to claim 1, wherein the halt processor makes the image processor halt the image processing at a time when the image reader finishes reading the document.

8. The image processing device according to claim 7, wherein
   the document feeder includes a document detector that detects the presence or absence of a document, and
   the halt processor determines a time when the image reader finishes reading the document in response to detection of the absence of the document by the document detector after the document feeder starts feeding the document automatically.

9. The image processing device according to claim 1, wherein the halt processor determines a page count of processed images to be generated as a result of the image processing by the image processor before the image reader starts reading the document, and after the image reader starts reading the document, the halt processor makes the image processor halt the image processing in response to generation of the processed images corresponding to the page count as a result of the image processing by the image processor.

10. The image processing device according to claim 9, wherein the halt processor acquires a page amount of the document to be read by the image reader and based on the acquired page amount of the document, the halt processor determines the page count of processed images to be generated as a result of the image processing by the image processor.

11. The image processing device according to claim 10, wherein the halt processor calculates a document reading time period required by the image reader to finish reading the document after the image reader starts reading the document based on the acquired page amount of the document to be read, calculates a processing time period required by the image processor to perform the image processing on one page, and determines the page count of processed images that can be generated within the document reading time period.

12. The image processing device according to claim 1, wherein if an interrupt job is received in a period of time from when the image reader starts reading the document until when the image reader finishes reading the document, the halt processor makes the image processor halt the image processing.

13. The image processing device according to claim 1, wherein the scanned image of the one page that has not been subjected to the image processing is transmitted to the information processing terminal during the generation of the scanned image.

14. The image processing device according to claim 1, wherein the halt processor halts the image processing when the last page is scanned or before the last page is scanned.

15. The image processing device according to claim 1, wherein the image processor performs the image processing on the scanned page at a same time as the image reader generates the scanned image, and the transmission processor transmits the processed image to the information processing terminal.

16. The image processing device according to claim 15, wherein the transmission processor transmits the scanned image of a page other than the processed image of the one page after the halt processor halts the image processing.

17. An image processing method implemented in an image processing device capable of communicating with an information processing terminal, the method making the image processing device perform image processing on a scanned image together with the information processing terminal in a distributed manner, the scanned image being formed by reading a document possessing a plurality of pages by scanning, the method comprising the steps of:
(a) automatically feeding pages of the document continuously one by one;
(b) generating a scanned image of one page by reading the document automatically fed;
(c) generating a processed image by performing image processing on the scanned image;
(d) halting the image processing in the step (c); and
(e) transmitting the processed image of at least one page of the plurality of pages generated as a result of the image processing in the step (c) to the information processing terminal and transmitting a scanned image of at least another page of the plurality of pages that has not been subjected to the image processing to the information processing terminal during the image processing or after halt of the image processing in the step (c),
wherein the one page of the plurality of pages and the another page of the plurality of pages are different pages in the document.

18. The image processing method according to claim 17, wherein in the step (d), the image processing in the step (c) is halted in a period of time from when reading the document is started until when the scanned image of the last page is generated in the step (b).

19. An image processing system comprising an information processing terminal and an image processing device capable of communicating with the information processing terminal, the image processing device comprising:
a document feeder that automatically feeds a plurality of pages of a document continuously one by one;
an image reader that generates a scanned image of one page by reading the document fed by the document feeder;
an image processor that generates a processed image by performing image processing on the scanned image generated by the image reader;
a halt processor that makes the image processor halt the image processing; and
a transmission processor that transmits the processed image of at least one page of the plurality of pages generated as a result of the image processing by the image processor to the information processing terminal and transmits a scanned image of at least another page of the plurality of pages that has not been subjected to the image processing by the image processor to the information processing terminal during the image processing or after halt of the image processing by the image processor,
the information processing terminal comprising:
a storage that stores the processed image transmitted by the transmission processor;
a processed image generating unit that generates a processed image by performing processing on the scanned image transmitted by the transmission processor same as the image processing to be performed by the image processor; and
a file generating unit that combines the processed image stored in the storage and the processed image generated by the processed image generating unit into an output file,
wherein the one page of the plurality of pages and the another page of the plurality of pages are different pages in the document.

20. The image processing system according to claim 19, wherein the halt processor makes the image processor halt the image processing in a period of time from when the image reader starts reading the document until when the image reader generates the scanned image of the last page.

21. A computer-readable non-transitory recording medium storing a program to be executed by an image processing device capable of communicating with an information processing terminal, the image processing device comprising a document feeder that automatically feeds a plurality of pages of a document continuously one by one and an image reader that generates a scanned image of one page by reading the document fed by the document feeder, the program causing the image processing device to function as a system comprising:
an image processor that generates a processed image by performing image processing on the scanned image generated by the image reader;
a halt processor that makes the image processor halt the image processing; and
a transmission processor that transmits the processed image of at least one page of the plurality of pages generated as a result of the image processing by the image processor to the information processing terminal and transmits a scanned image of at least another page of the plurality of pages that has not been subjected to the image processing by the image processor to the information processing terminal during the image processing or after halt of the image processing by the image processor, wherein the one page of the plurality of pages and the another page of the plurality of pages are different pages in the document.

22. The computer-readable non-transitory recording medium according to claim 21, wherein the halt processor makes the image processor halt the image processing in a period of time from when the image reader starts reading the document until when the image reader generates the scanned image of the last page.

* * * * *